(12) United States Patent
Honda

(10) Patent No.: US 6,464,872 B1
(45) Date of Patent: Oct. 15, 2002

(54) FUEL FILTER WITH INLET HOLDING MEMBER

(75) Inventor: Itsuo Honda, Sagamihara (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/332,975

(22) Filed: Jun. 15, 1999

(30) Foreign Application Priority Data

Jun. 17, 1998 (JP) .......................................... 10-185761

(51) Int. Cl.⁷ ........................ B01D 27/08; B01D 35/027
(52) U.S. Cl. .................................... 210/416.4; 210/461
(58) Field of Search ............................ 210/416.4, 459, 210/460, 461, 463

(56) References Cited

U.S. PATENT DOCUMENTS

| | | |
|---|---|---|
| 4,743,370 A | 5/1988 | Mizusawa |
| 5,049,271 A | 9/1991 | Cain |
| 5,665,229 A * | 9/1997 | Fitzpatrick et al. |
| 5,928,507 A * | 7/1999 | Chiga |

FOREIGN PATENT DOCUMENTS

WO        97/46800        12/1997

* cited by examiner

Primary Examiner—David A. Simmons
Assistant Examiner—Fred Prince
(74) Attorney, Agent, or Firm—Kanesaka & Takeuchi

(57) ABSTRACT

A fuel filter of the invention is attached to a suction side of a fuel pump. The filter includes a bag member made of a filtration material, a cylindrical portion provided to the bag member to allow the suction side of the fuel pump to communicate with an interior of the bag member, and a shape keeping frame for the bag member extending from the cylindrical portion to an inside of the bag member. The shape keeping frame includes a plate shape portion to make a surface contact with an inner surface of the bag member in front of an opening of the cylindrical portion inside the bag member. Thus, the fuel filter does not impair a suction ability of the fuel pump even if a space between the opening of the cylindrical portion as the suction side of the fuel pump and the inner surface of the bag member opposed thereto is narrow.

9 Claims, 22 Drawing Sheets

FUEL FILTER WITH INLET HOLDING MEMBER

BACKGROUND OF THE INVENTION AND RELATED ART STATEMENT

The invention relates to a fuel filter to be attached to a suction side of a fuel pump provided in a fuel tank.

It has generally been practiced that a bag filter or bag shape filter made of a filtration cloth is provided on a suction side of a fuel pump disposed in a fuel tank, and fuel filtrated and taken into the bag shape filter is supplied to an engine through the fuel pump.

However, in case the filter formed of the bag shape member made of the filtration cloth is provided on the suction side of the fuel pump and the fuel filtrated and taken into the bag shape member is supplied to the engine through the fuel pump, a portion of the bag shape member facing a suction port communicating with the fuel pump and opened inside the bag shape member is sucked toward the suction port, so that the suction port is closed by the portion of the bag shape member to thereby impair the suction ability of the fuel pump.

In view of the above defects, there has been practiced that a plurality of bar members or bag shape members is provided to project toward the inside of the bag shape member from an opening edge portion of the suction port of the bag shape member, so that a portion of the bag shape member located in front of the suction port is supported by the forward edges of the bar shape members when the portion of the bag shape member is moved toward the suction port side upon suction by the fuel pump.

However, the filter having the bar shape members projecting from the opening edge portion of the suction port of the bag shape member for supporting the portion of the bag shape member facing the suction port thereof is useful in case the bag shape member constituting the filter has an enough space between the suction port side and the portion of the bag shape member facing thereto, in other words, in case there is a space for allowing the fuel to properly flow from a side portion between the portion of the bag shape member sacked toward the suction port and the suction port upon sucking action of the fuel pump. However, in case a relatively large space can not be formed between the suction port side and the portion of the bag shape member facing thereto, the filter of this type is not always practical.

In view of the above, it is an object of the present invention to provide a fuel filter, wherein even if a space between an opening surface of a cylindrical portion opened inside a bag shape member communicating with a sucking side of a fuel pump and an inner surface of the bag shape member facing the opening surface is small, a suction ability of the fuel pump can not be impaired.

It is another object of the invention to provide a fuel filter as stated above, which can be made compact and allow fuel to pass all around the fuel filter.

It is a further object of the invention to provide a fuel filter as stated above, which allows the fuel pump to be positioned close to the inner bottom surface of the fuel tank.

Further objects and advantages of the invention will be apparent from the following description of the invention.

SUMMARY OF THE INVENTION

A fuel filter according to one aspect of the invention is provided to a sucking side of a fuel pump disposed in a fuel tank. The fuel filter includes a bag member or bag shape member made of a filtration cloth, a cylindrical portion provided to the bag shape member to communicate the suction side of the fuel pump with an interior of the bag shape member, and a shape keeping frame for the bag shape member extending from an inner side of the cylindrical portion inside the bag shape member to the inside of the bag shape member. Further, the fuel filter includes a plate shape portion located in front of an opening of the cylindrical portion in the bag shape member to make a surface contact with an inner surface of the bag shape member in front of the opening.

In the fuel filter thus structured, when the fuel in the fuel tank is sucked into the bag shape member upon suction of the fuel in the bag shape member through operation of the fuel pump, the portion of the bag shape member located in front of the opening of the cylindrical portion is surface-wisely received or horizontally supported by the plate shape portion disposed in front of the opening, so that a passage for guiding, without any resistance, the fuel sucked into the bag shape member is formed between the opening and the plate shape portion in front of the opening, and the fuel is supplied to the fuel pump through the passage.

A fuel filter according to a second aspect of the invention to attain the aforementioned objects has a feature such that, in the fuel filter as described in the first aspect, the bag shape member has a flat shape so that the bag shape member can be provided along a lower surface side of an inner bottom surface of the fuel tank.

In the fuel filter thus structured, in addition to the aforementioned features, further, even if a space between the opening as the suction port of the fuel pump disposed in the fuel tank and an inner bottom surface of the fuel tank is relatively narrow, the fuel filter can be provided to the suction side of the fuel pump.

Further, a fuel filter according to a third aspect of the invention to attain the aforementioned objects has a feature such that, in the fuel filter relating to the first and second aspects, the plate shape portion is provided with holes for allowing the fuel to pass through.

In the fuel filter thus structured, in addition to the aforementioned features, the fuel can also be sucked from the portion of the bag shape member which contacts the plate shape portion located in front of the opening of the cylindrical portion.

Also, a fuel filter according to a fourth aspect of the invention to attain the aforementioned objects has a feature such that, in the fuel filter relating to the first, second and third aspects, the shape keeping frame includes a plurality of bar shape portions extending radially outwardly from a center thereof.

In the fuel filter thus structured, in addition to the aforementioned features, further, the fuel sucked into the bag shape member can be properly guided toward the center thereof.

Furthermore, a fuel filter according to a fifth aspect of the invention to attain the aforementioned objects has features such that, in the fuel filter relating to the first, second and third aspects, the shape keeping frame includes a ring portion; a central plate shape portion disposed at about a center of the ring portion away from the opening of the cylindrical portion; the plate shape portion connected to the central plate shape portion; bar shape portions provided between the ring portion and the central plate shape portion or the plate shape portion and extending radially inwardly of the ring portion. The ring portion and the bar shape portions are provided with abutting pieces projecting to a direction opposite to the cylindrical portion.

In the fuel filter thus structured, in addition to the aforementioned features, further, the fuel sucked into the bag shape member is properly guided toward the cylindrical portion.

Furthermore, a fuel filter according to a sixth aspect of the invention to attain the aforementioned objects has features such that, in the fuel filter relating to the first, second, third, fourth and fifth aspects, the shape keeping frame includes the plate shape portion, and, the plate shape portion is disposed in front of the cylindrical portion away from the opening thereof by a space holding device.

In the fuel filter thus structured, in addition to the aforementioned features, further, the plate shape portion disposed in front of the opening of the cylindrical portion is held with a predetermined space between the opening side and itself even if the fuel pump is actuated, so that the fuel passage can be surely established between the plate shape portion and the opening of the cylindrical portion.

Furthermore, a fuel filter according to a seventh aspect of the invention to attain the aforementioned objects has features such that, in the fuel filter relating to the sixth aspect, the space holding device includes first projections provided to one of the plate shape portion of the shape keeping frame and the cylindrical portion opposed thereto, and second projections with holes for receiving the first projections therein provided to the other of the plate shape portion and the cylindrical portion. The shape keeping frame is assembled with the cylindrical portion so that the first projections are inserted into the holes of the second projections to keep the inserted state by the bag shape member.

In the fuel filter structured as described above, in addition to the aforementioned features, further, the first projections and the second projections function as guides when the shape keeping frame is assembled with the cylindrical portion, and also function to allow the plate shape portion to make a parallel movement in front of the opening of the cylindrical portion when the bag shape member is bent or deformed.

DETAILED DESCRIPTION OF PREFERRED EMBODIMENTS

Figure 1:
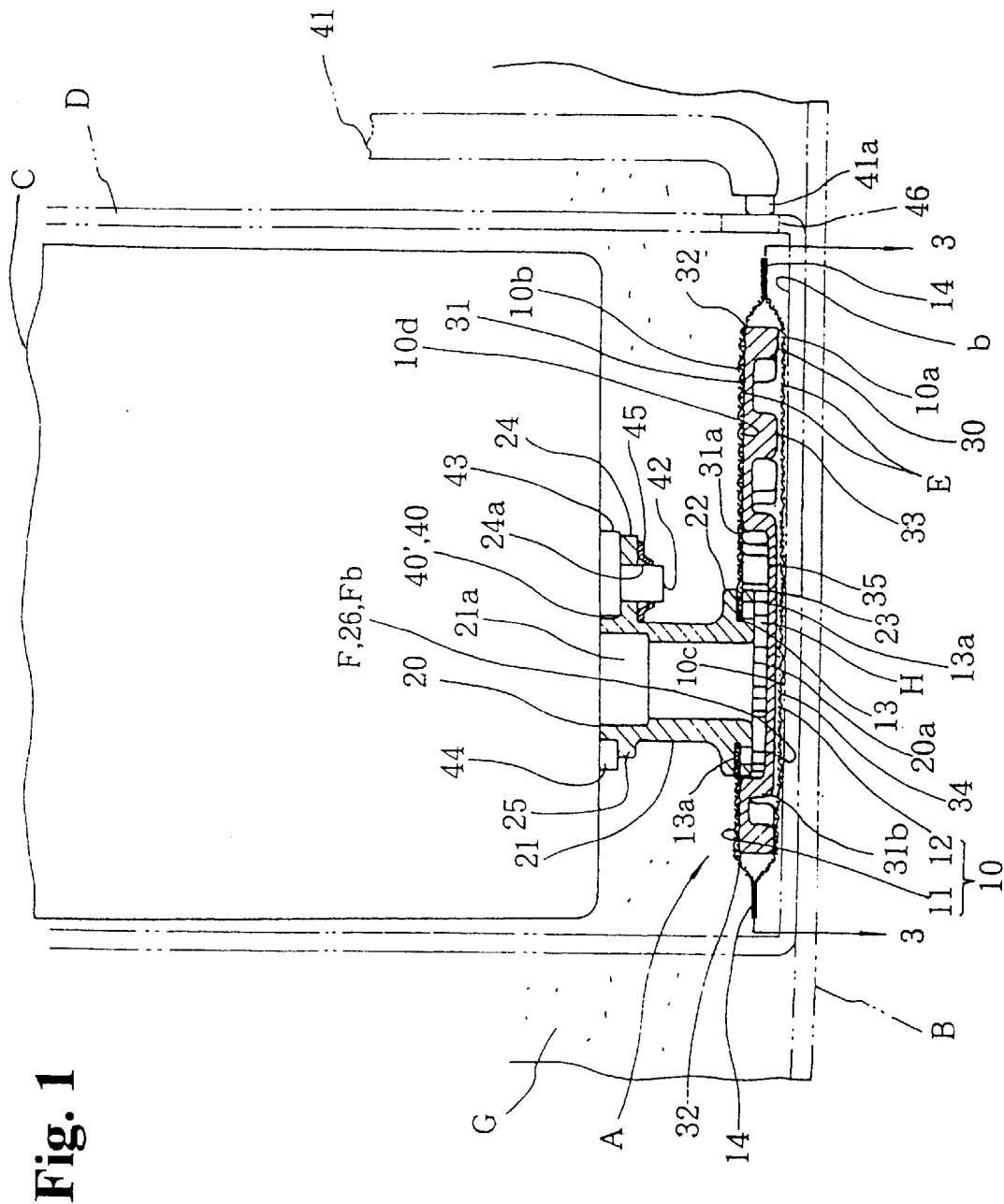
FIG. 1 is a sectional view of an essential part showing an attaching state of a fuel filter A of a first embodiment according to the present invention.

Hereunder, typical fuel filters of the embodiments according to the present invention are described in detail.

A fuel filter A or A' of the embodiment according to the present invention is a fuel filter provided to a fuel pump C for supplying fuel G, such as gasoline, to an engine, more specifically, provided to a suction side 40' of the fuel pump C disposed inside a fuel tank B. The fuel filter A or A' includes a bag member or bag shape member 10 made of a filtration cloth E; a cylindrical portion 20 provided to the bag shape member 10 so as to communicate with the suction side 40' of the fuel pump C in the bag shape member 10; a shape keeping frame 30 for keeping a shape of the bag shape member 10 and extending from the inside of the bag shape member 10 at the cylindrical portion 20 across the bag shape member 10; and a plate shape portion 34 to make a surface contact with an inner surface 10c of the bag shape member 10 present in front of an opening 20a of the cylindrical portion 20 in the bag shape member 10.

In the fuel filter A or A' thus structured, when the fuel G in the fuel tank B is sucked into the bag shape member 10 as the fuel G in the bag shape member 10 is sucked through operation of the fuel pump C, the inner surface 10c of the bag shape member 10 in front of the opening 20a of the cylindrical portion 20 is received laterally by the plate shape portion 34 provided in front of the opening 20a. Namely, there is formed a passage H between the plate shape portion 34 in front of the opening 20a and the opening 20a, through which the fuel G sucked in the bag shape member 10 is smoothly guided. Thus, in the fuel filter A or A',g the fuel G is supplied to the fuel pump C through the passage H.

Next, in addition to the fuel filter A or A' constructed as described above, the bag shape member 10 is structured such that a lower surface side 10a thereof is provided along an inner bottom surface b of the fuel tank B so as to be a flat shape.

In the fuel filter A or A' thus structured, in addition to the features as described above, there is a further feature such that even if a space between the opening 20a as a sucking port of the fuel pump C provided inside the fuel tank B and the inner bottom surface b of the fuel tank B is relatively narrow, the fuel filter A or A' can be provided to the suction side 40' of the fuel pump C.

In the fuel filter A', in addition to the features as described above, the plate shape portion 34 may include flowing holes 37 of the fuel G.

In the fuel filter A' thus structured, in addition to the features as described above, there is still another feature such that the fuel G can also be sucked through a portion of the bag shape member 10 which contacts the plate shape portion 34 in front of the opening 20a of the cylindrical portion 20.

Also, in addition to the structure of the fuel filter A or A' as described above, the shape keeping frame 30 may include a plurality of bar shape portions 31 extending radially outwardly from a center thereof.

In the fuel filter A or A' thus structured, in addition to the above described features, there is a further feature wherein the fuel G sucked into the bag shape member 10 can be properly guided toward the central direction.

Further, in addition to the fuel filter A or A' constructed as described above, the shape keeping frame 30 may include a ring shape portion 32; a central plate shape portion 35 located at about a center portion and disposed slightly away from the opening 20a of the cylindrical portion 20; the plate shape portion 34 connected to the central plate shape portion 35; the bar shape portions 31 provided among the ring shape portion 32, the central plate shape portion 35 and the plate shape portion 34, and extending radially inwardly from the ring shape portion 32; and abutting pieces 33 provided to the ring shape portion 32 and the bar shape portions 31 and projecting in the direction opposite to the cylindrical portion 20.

In the fuel filter A or A' thus structured, in addition to the features as described above, there is a further feature such that the fuel G sucked into the bag shape member 10 is properly guided toward the cylindrical portion 20.

Also, in addition to the structure of the fuel filter A or A' as described above, the shape keeping frame 30 may include a space holding device F so that the plate shape portion 34 is disposed in front of and away from the opening 20a of the cylindrical portion 20.

In the fuel filter A or A' thus structured, in addition to the features as described above, further, the plate shape portion 34 positioned in front of the opening 20a of the cylindrical portion 20 is held with a predetermined space from the side of the opening 20a even when the fuel pump C is operated, so that the passage H of the fuel G can be held between the plate shape portion 34 and the opening 20a of the cylindrical portion 20.

Furthermore, in addition to the fuel filter A or A' having the structure as described above, the space holding device F may include first projections Fa provided to one of the plate shape portion 34 of the shape keeping frame 30 and the cylindrical portion 20 facing thereto, and second projections Fb provided to the other and having holes Fb' for receiving the first projections Fa. The shape keeping frame 30 is assembled with the cylindrical portion 20, so that the first projections Fa are inserted into the holes Fb' of the second projections Fb and the inserted state of the first projections Fa can be held by the bag shape member 10.

In the fuel filter A or A' thus structured, in addition to the features as described above, further, there are features such that the first projections Fa and the second projections Fb with the holes Fb' for receiving the first projections Fa operate as guides when the shape keeping frame 30 is assembled with the cylindrical portion 20, and also allow the plate shape portion 34 to make a parallel displacement in the front and rear directions in a state where a surface of the plate shape portion 34 positioned in front of the opening 20a of the cylindrical portion 20 faces the opening 20a when the bag shape member 10 is bent or deformed.

Next, the fuel filters A and A' of the embodiment according to the invention are specifically described.

FIGS. 1–16 show a fuel filter A of a first embodiment of the invention; and FIGS. 17–32 show a fuel filter A' of a second embodiment of the invention.

Figure 2:
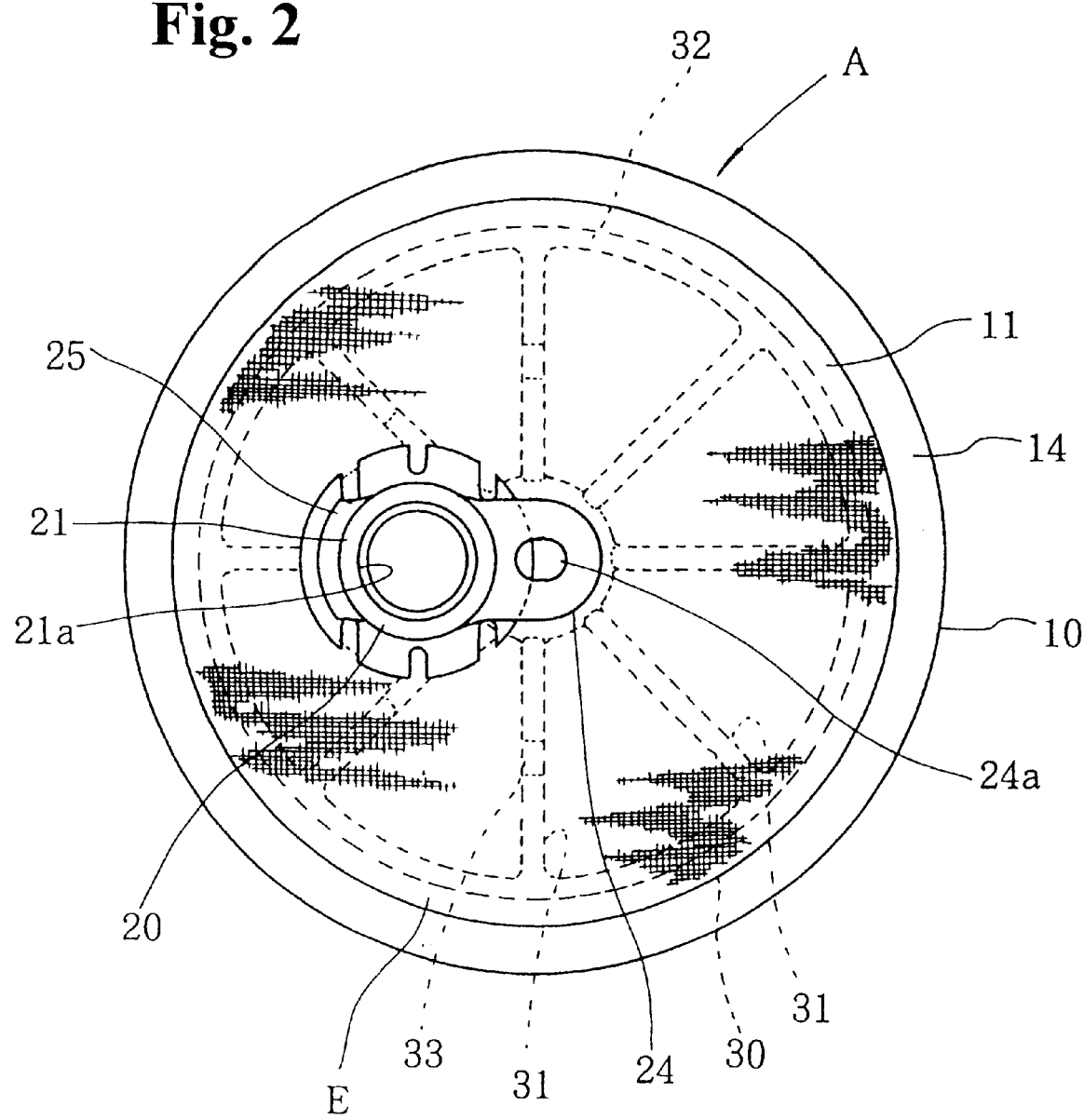
FIG. 2 is a plan view of the fuel filter A.
Figure 3:
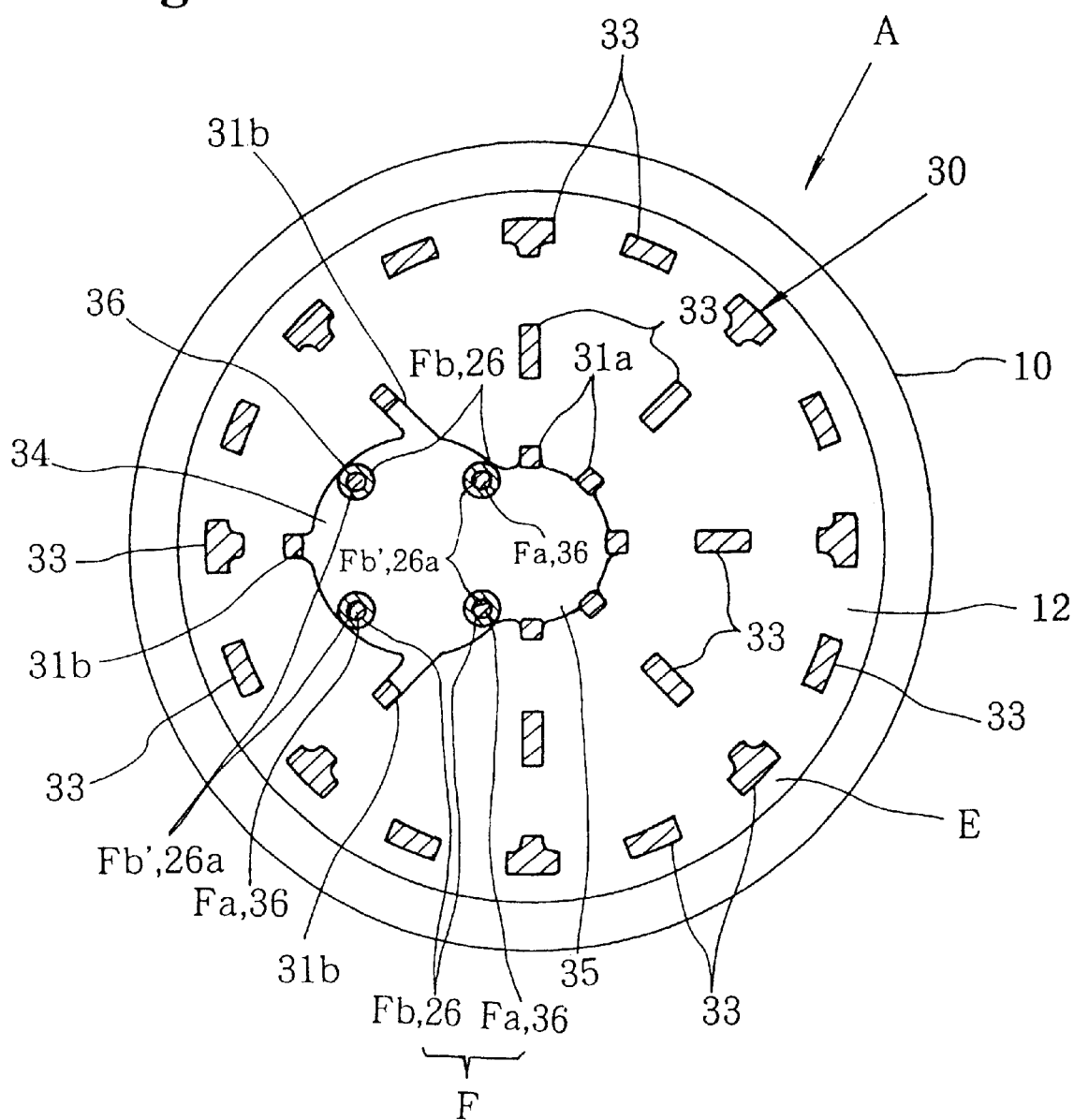
FIG. 3 is a sectional view taken along line 3—3 in FIG. 1.
Figure 4:
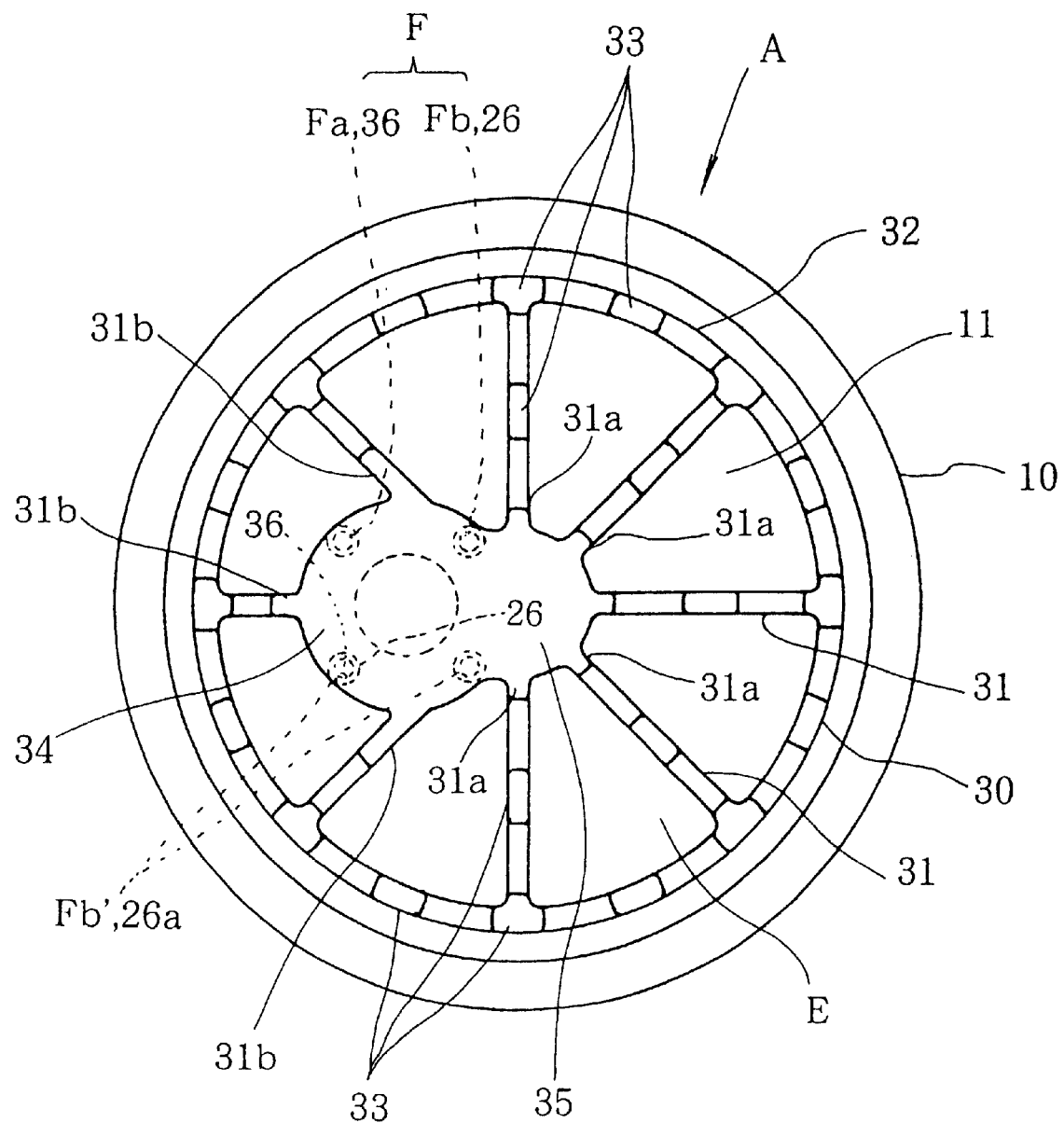
FIG. 4 is a bottom view showing a state where a lower filtration cloth of the fuel filter A is removed.
Figure 5:
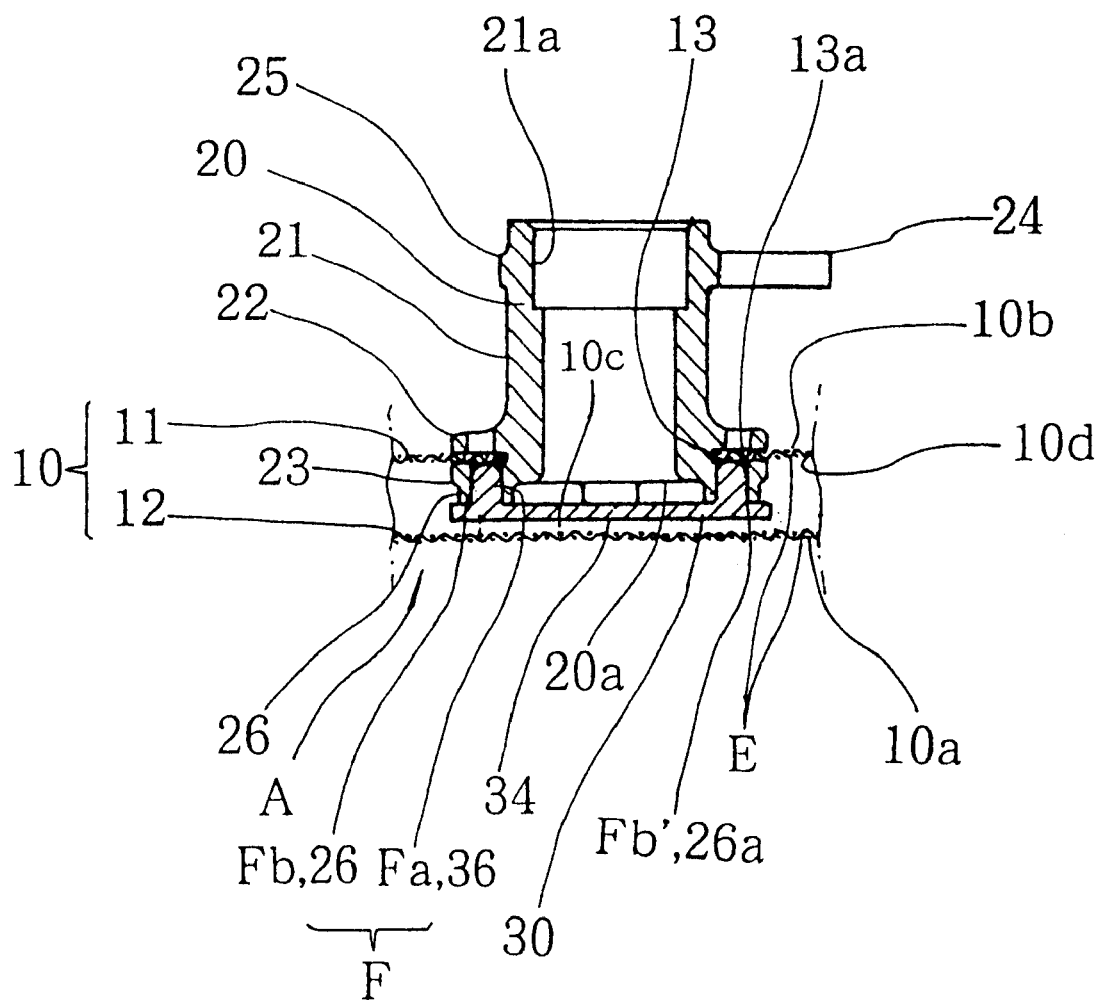
FIG. 5 is a sectional view of an essential part showing an attaching portion of the fuel filter A to a cylindrical portion.

FIG. 1 is a sectional view of an essential part showing a state where the fuel filter A of the first embodiment is assembled with a fuel pump C and is attached to a fuel tank B shown by imaginary lines; FIG. 2 is a diagram showing a state before the fuel filter A is assembled with the fuel pump C and viewed from an upper surface thereof; FIG. 3 is a sectional view taken along line 3—3 in FIG. 1 by cutting the fuel filter A in the horizontal direction so that a flow passage of fuel G in the fuel filter A can be understood; FIG. 4 is a diagram for showing a bottom surface side of the fuel filter A from which a lower side filtration cloth 12 is removed and viewed from a lower side to easily understand the fuel filter; and FIG. 5 is a sectional view of an essential part of the fuel filter A to facilitate understanding of an assembled portion of a shape keeping frame 30 in the fuel filter A.

Figure 6:
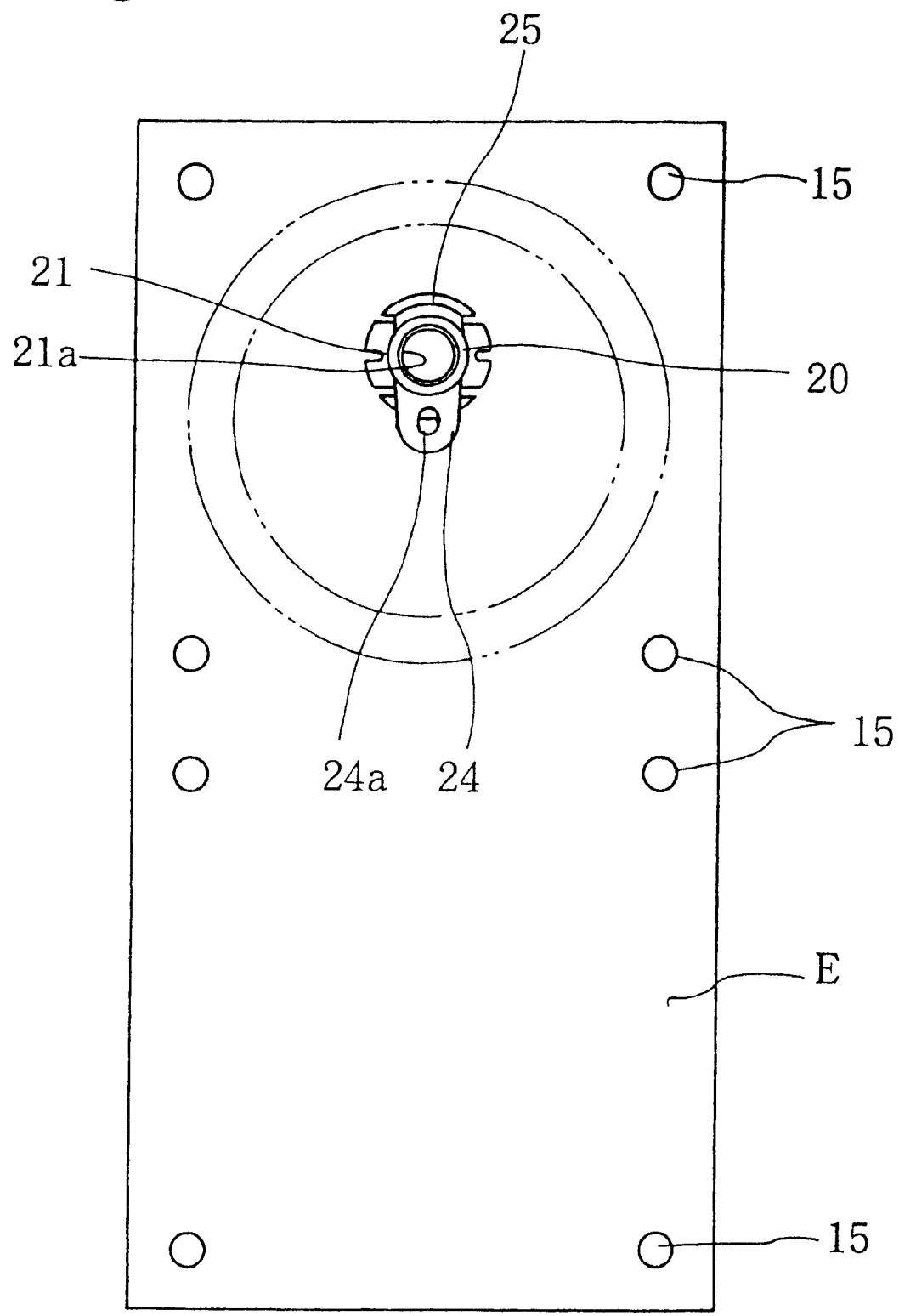
FIG. 6 is a plan view of a filtration cloth with a cylindrical portion for constituting the fuel filter A.
Figure 7:
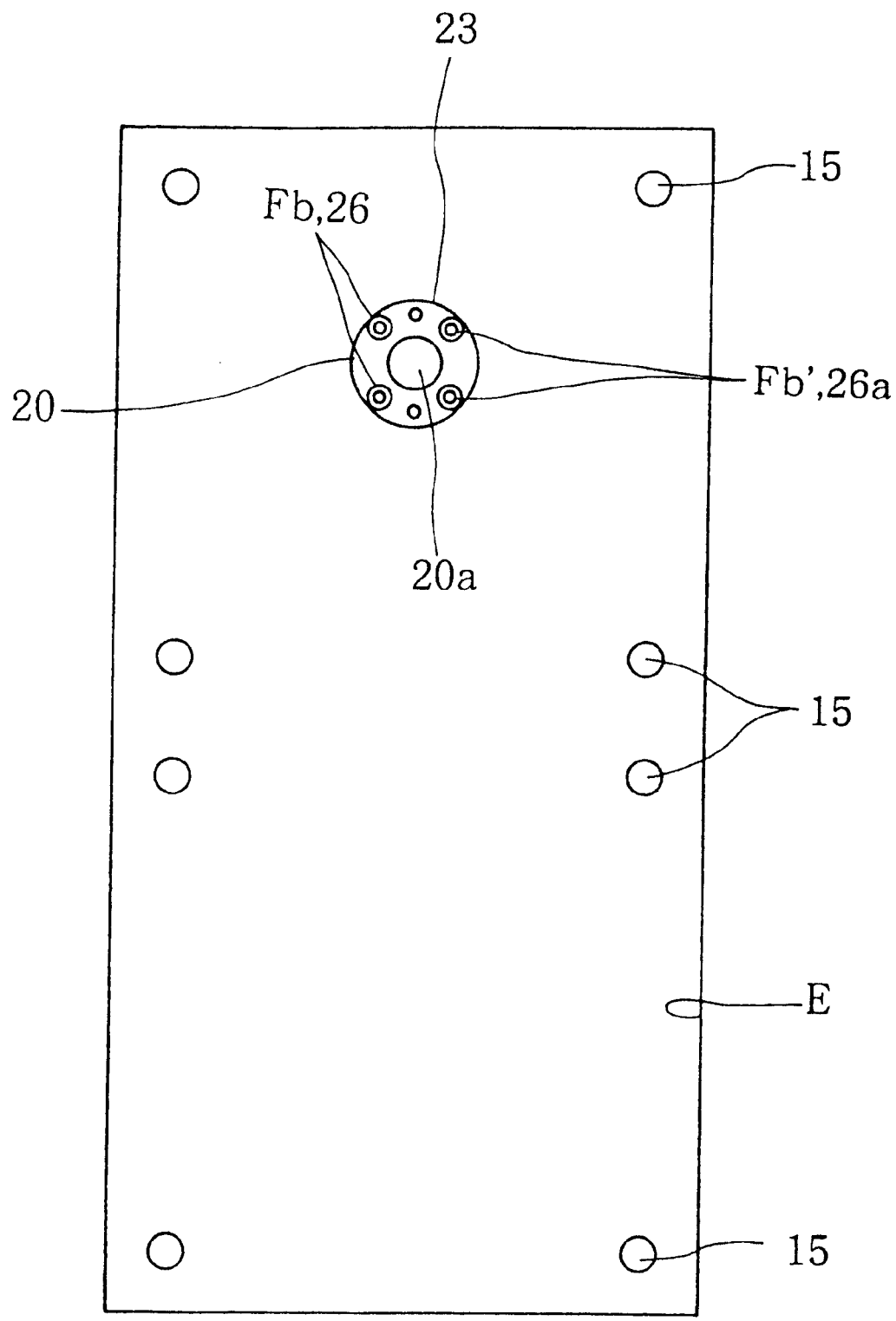
FIG. 7 is a bottom view of the filtration cloth with the cylindrical portion for constituting the fuel filter A.
Figure 8:
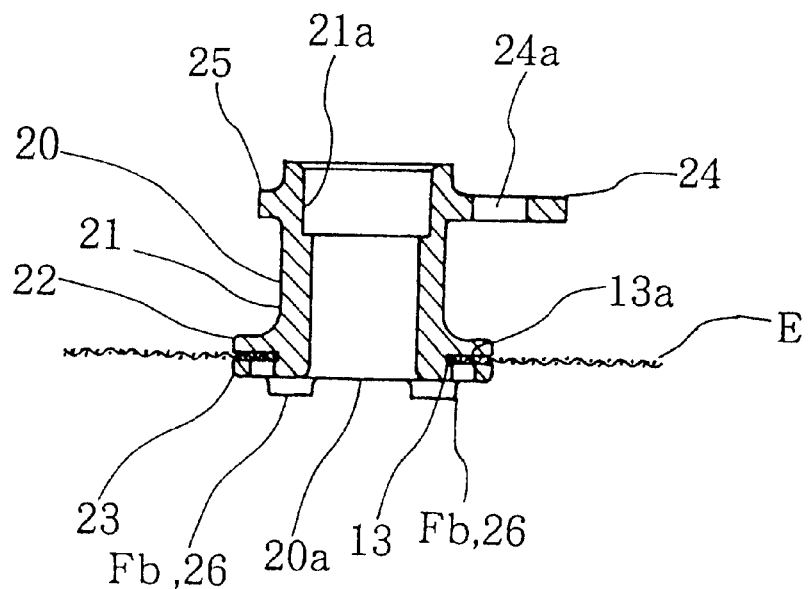
FIG. 8 is a sectional view of an essential part showing the attaching portion of the fuel filter A to the cylindrical portion.
Figure 9:
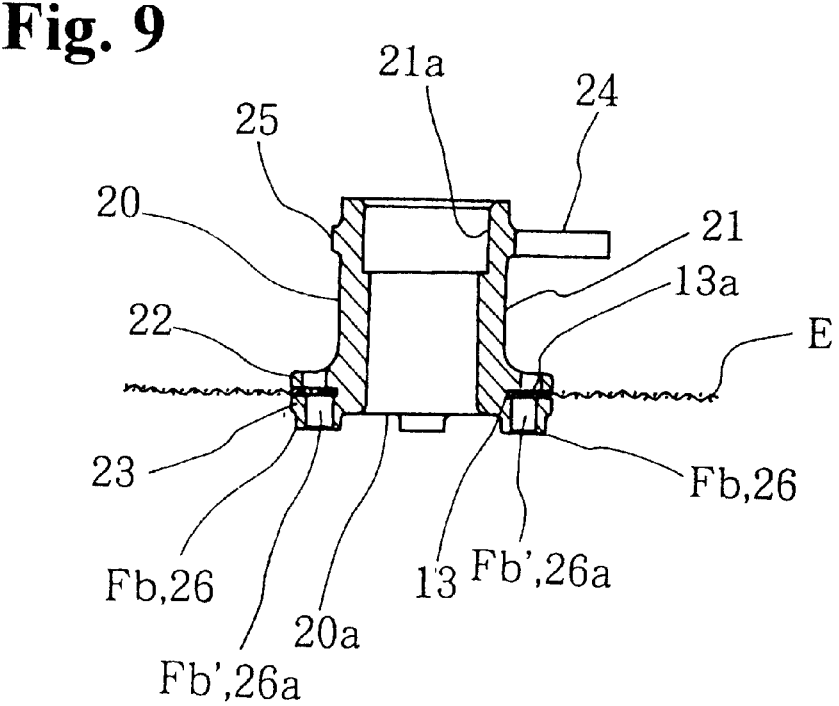
FIG. 9 is a sectional view of an essential part cut in a different direction showing the attaching portion of the fuel filter A to the cylindrical portion.

FIGS. 6–16 are drawings showing constituting members of the fuel filter A of the present embodiment along the production stages. FIG. 6 is a diagram showing a state before a filtration cloth E with a cylindrical portion 20 is formed into a bag shape member 10 and viewed from an upper side; FIG. 7 is a diagram showing a state of the FIG. 6 but viewed from a lower side; FIGS. 8 and 9 are sectional views showing an essential part of a joint portion of the filtration cloth E and the cylindrical portion 20 but cut in different directions, wherein FIG. 8 is a sectional view taken in a lengthwise direction of the filtration cloth E, and FIG. 9 is a sectional view taken along a surface including a supporting projection 26.

Figure 10:
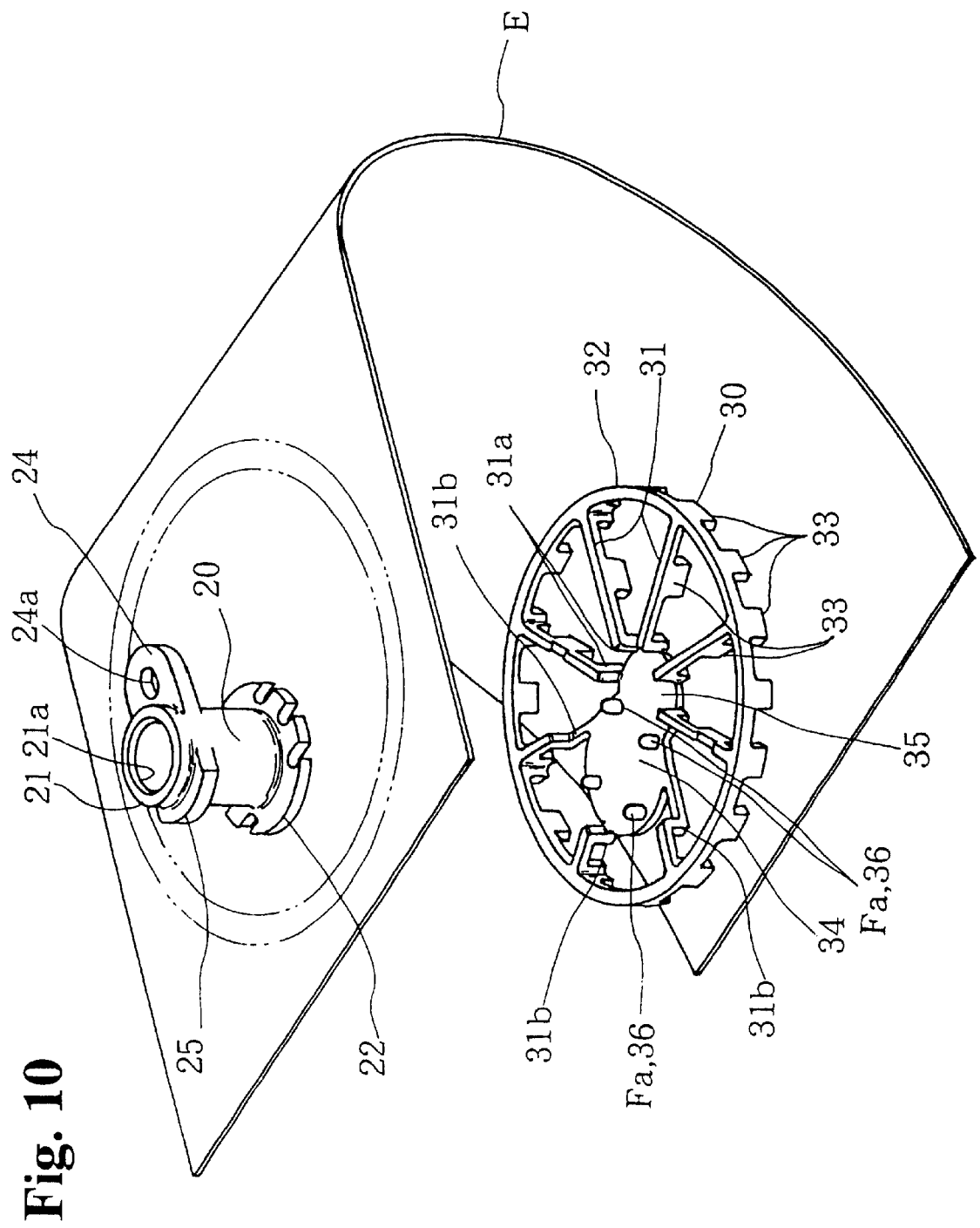
FIG. 10 is a perspective view showing an assembling state of the filtration cloth with the cylindrical portion for constituting the fuel filter A and a shape keeping frame to be wrapped by the filtration cloth.

FIG. 10 is a perspective view showing a state where the shape keeping frame 30 is wrapped by the filtration cloth E with the cylindrical portion 20 to form the fuel filter A.

Figure 11:
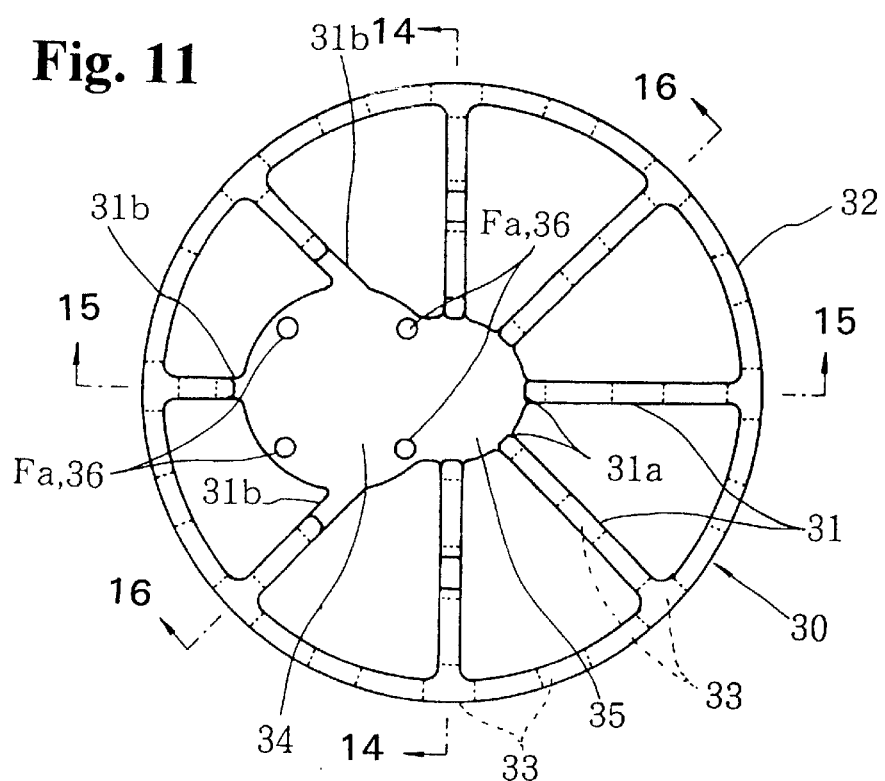
FIG. 11 is a plan view of the shape keeping frame for constituting the fuel filter A.
Figure 12:
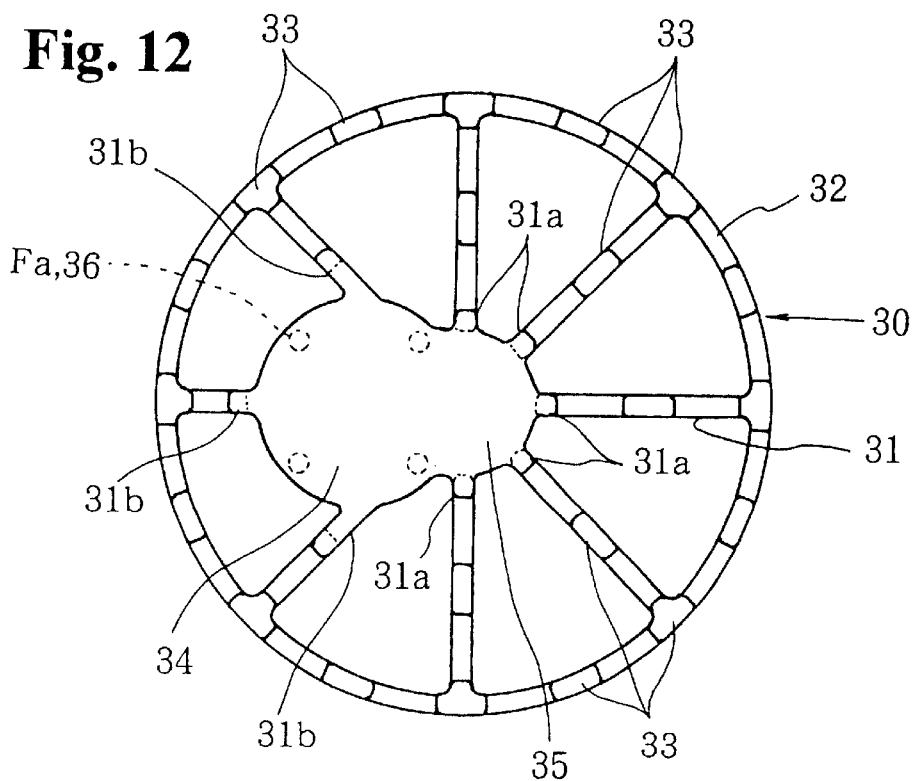
FIG. 12 is a bottom view of the shape keeping frame.
Figure 13:
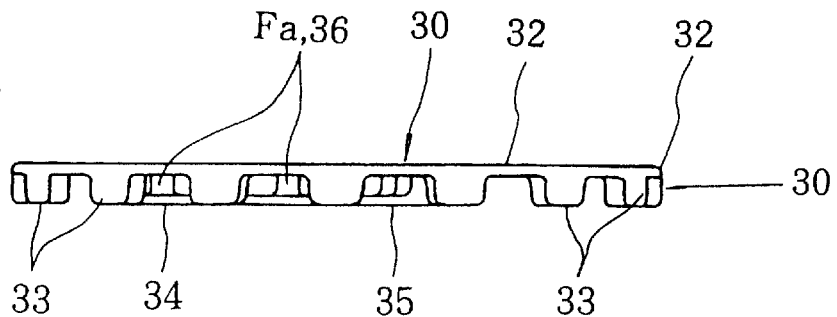
FIG. 13 is a front view of the shape keeping frame.
Figure 14:
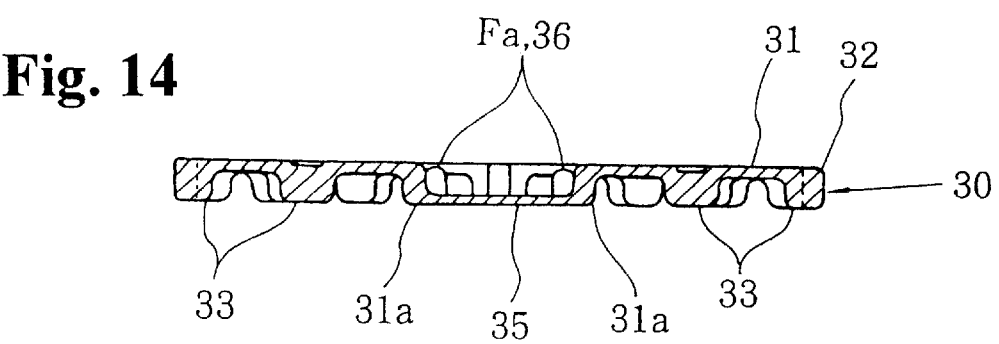
FIG. 14 is a sectional view taken along line 14—14 in FIG. 11.
Figure 15:
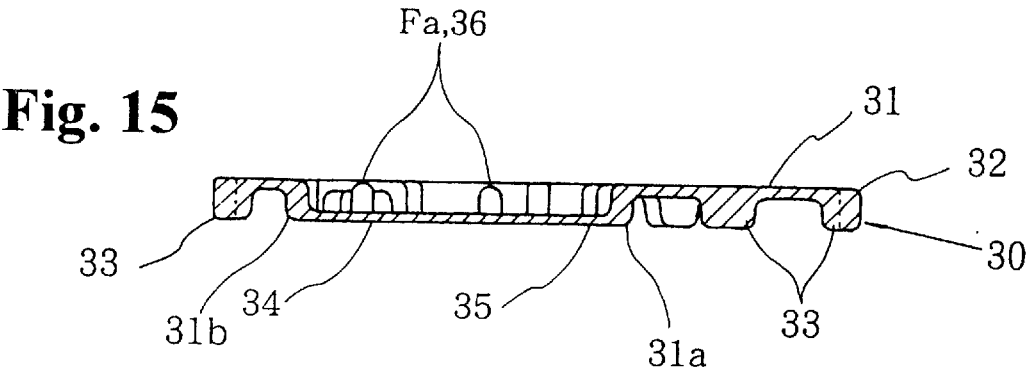
FIG. 15 is a sectional view taken along line 15—15 in FIG. 11.
Figure 16:
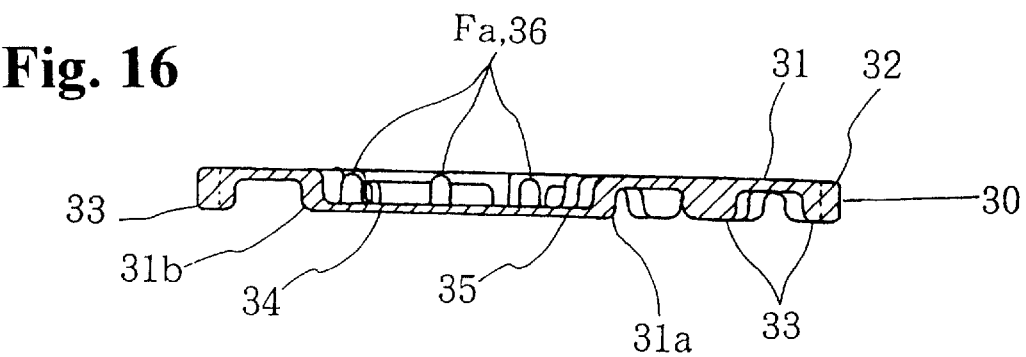
FIG. 16 is a sectional view taken along line 16—16 in FIG. 11.

FIGS. 11–16 are drawings showing the shape keeping frame 30 for constituting the fuel filter A, wherein FIG. 11 is a drawing viewed from an upper part thereof; FIG. 12 is a drawing viewed from a lower part thereof; and FIG. 13 is a drawing viewed from a front side thereof. FIG. 14 is a sectional view taken along line 14—14 in FIG. 11 passing through only a central plate shape portion 35; FIG. 15 is a sectional view taken along line 15—15 in FIG. 11 passing through the centers of the central plate shape portion 35 and a plate shape portion 34; and FIG. 16 is a sectional view taken along line 16—16 in FIG. 11 passing through a side portion of the plate shape portion 34 and the center of the central plate shape portion 35.

Figure 17:
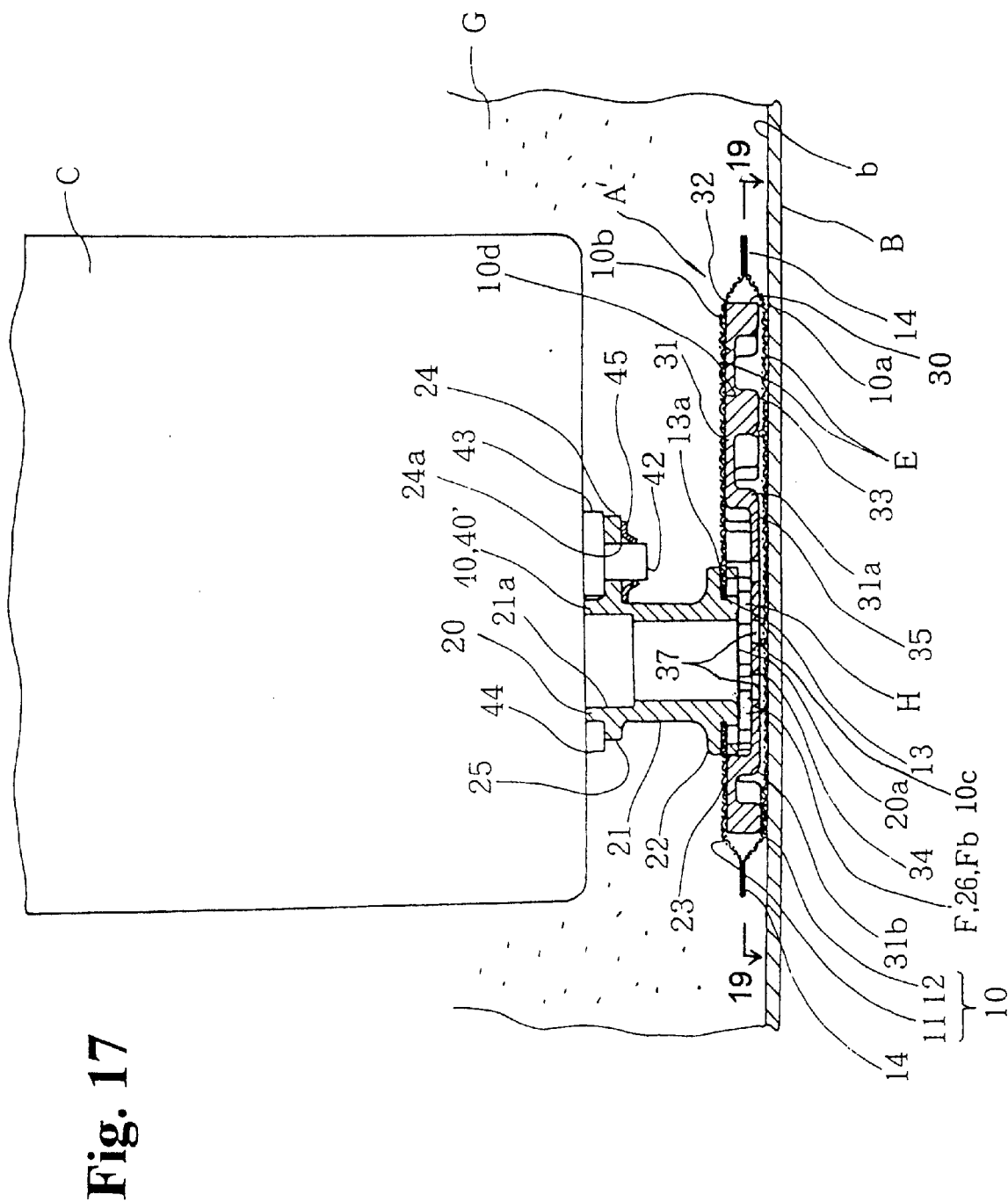
FIG. 17 is a sectional view of an essential part showing an attaching state of the fuel filter A' according to a second embodiment.
Figure 18:
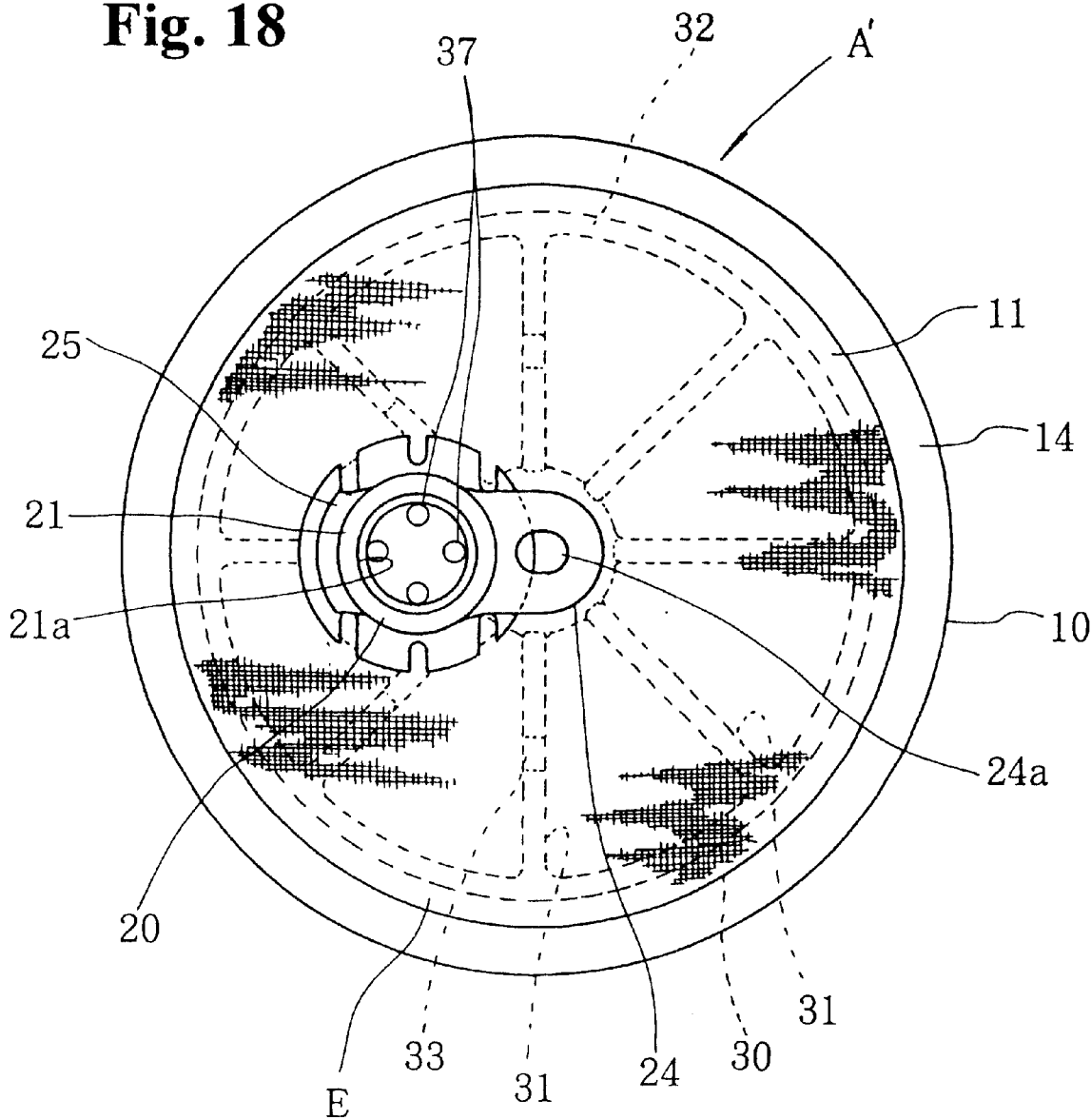
FIG. 18 is a plan view of the fuel filter A' of the second embodiment.
Figure 19:
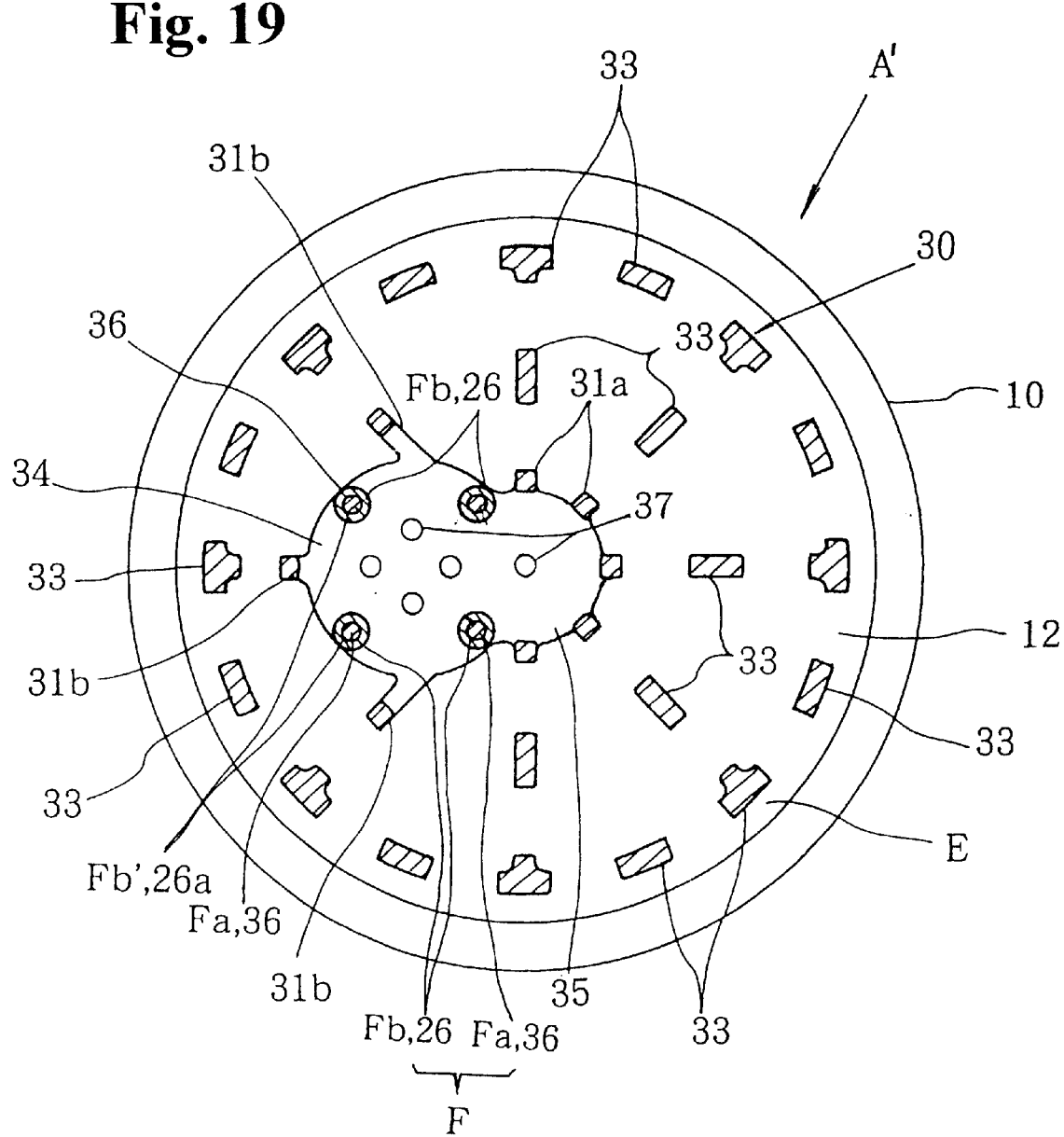
FIG. 19 is a sectional view taken along line 19—19 in FIG. 17.
Figure 20:
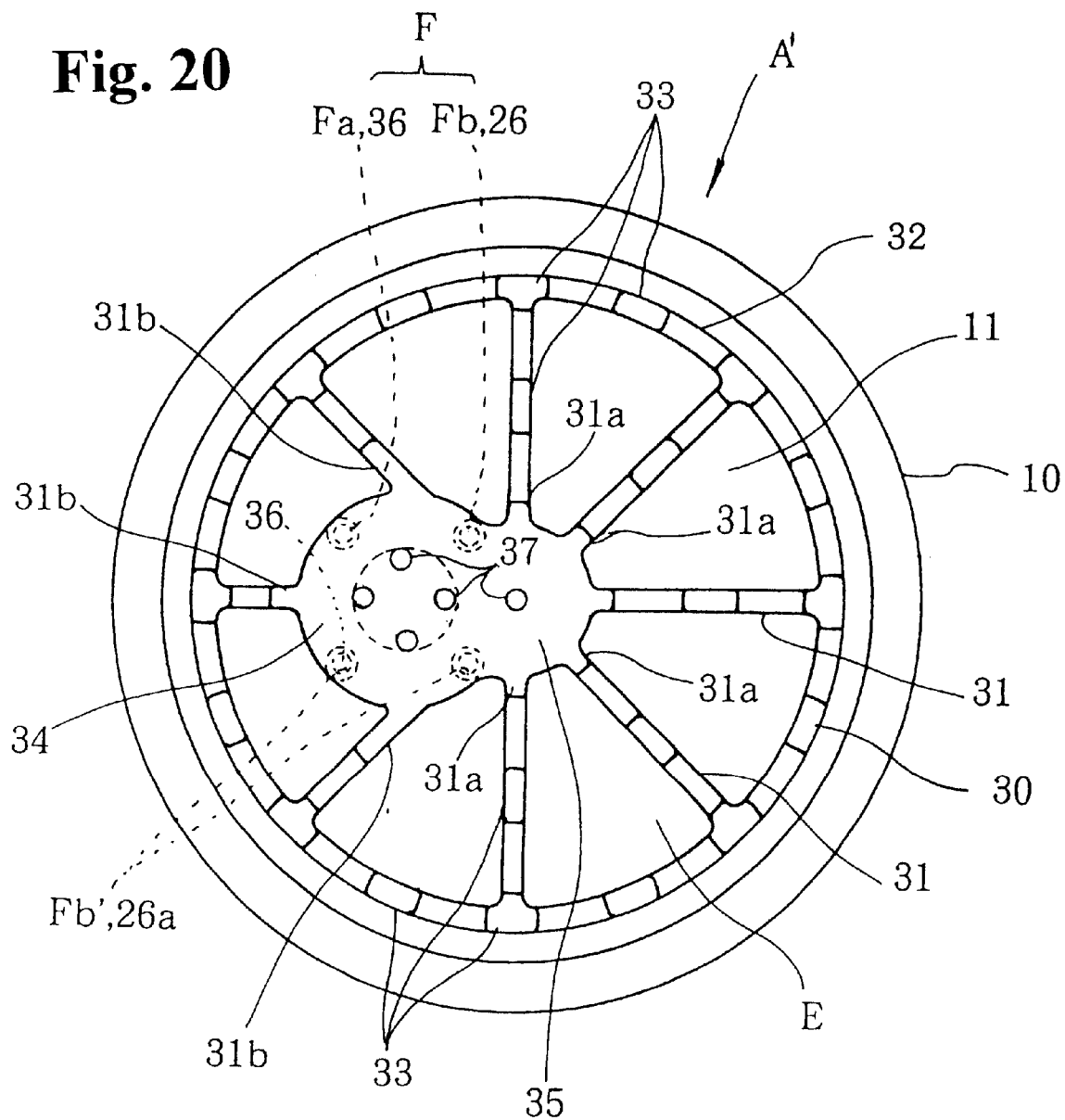
FIG. 20 is a bottom view showing a state where a lower filtration cloth is removed.
Figure 21:
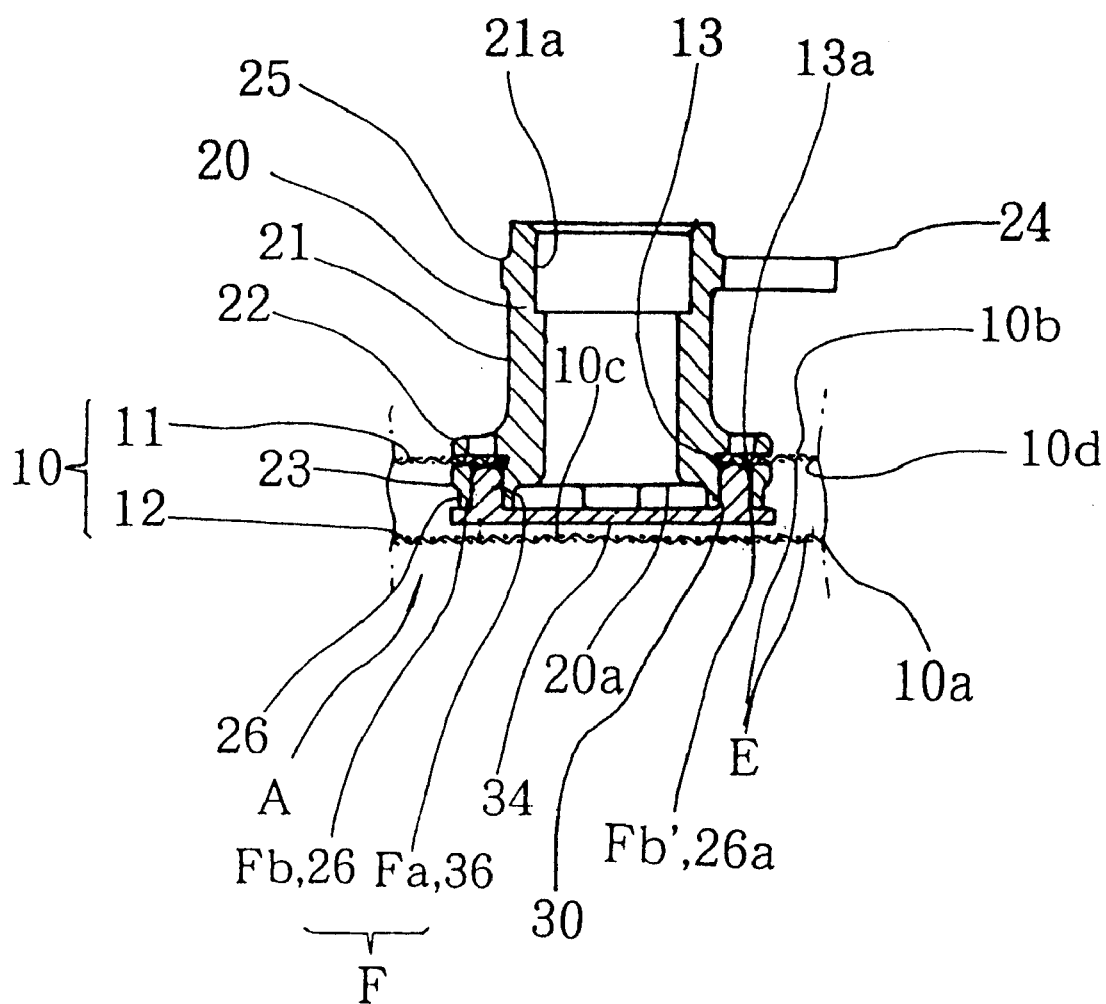
FIG. 21 is a sectional view of an essential part showing an attaching portion of the cylindrical portion of the fuel filter A'.

FIG. 17 is a sectional view of an essential part where a fuel filter A' of a second embodiment is attached to a fuel pump C; FIG. 18 is a diagram showing a state before the fuel filter A' is assembled with the fuel pump C and viewed from an upper side; FIG. 19 is a sectional view taken horizontally at a welded position of an upper filtration cloth 11 and a lower filtration cloth 12 of the fuel filter A' to facilitate understanding of a flow passage of fuel G in the fuel filter A'; FIG. 20 is a diagram for showing a bottom surface side of the fuel filter A' where the lower filtration cloth 12 is removed and viewed from a lower side to facilitate understanding of the bottom surface side of the fuel filter A'; and FIG. 21 is a sectional view of an essential part of the fuel filter A' to facilitate understanding of an assembling portion of the shape keeping frame 30 for the fuel filter A'.

Figure 22:
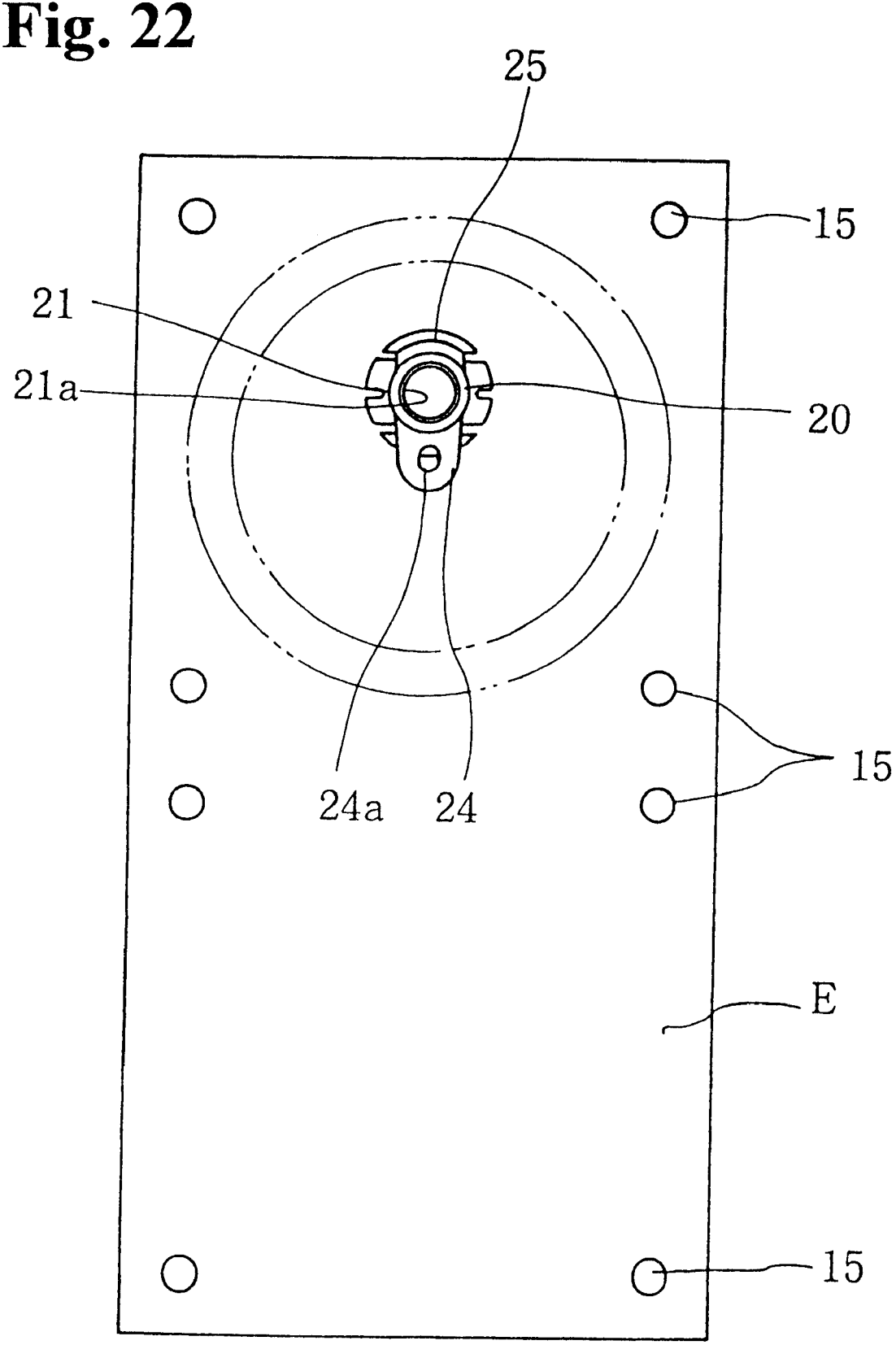
FIG. 22 is a plan view of the filtration cloth with the cylindrical portion for constituting the fuel filter A'.
Figure 23:
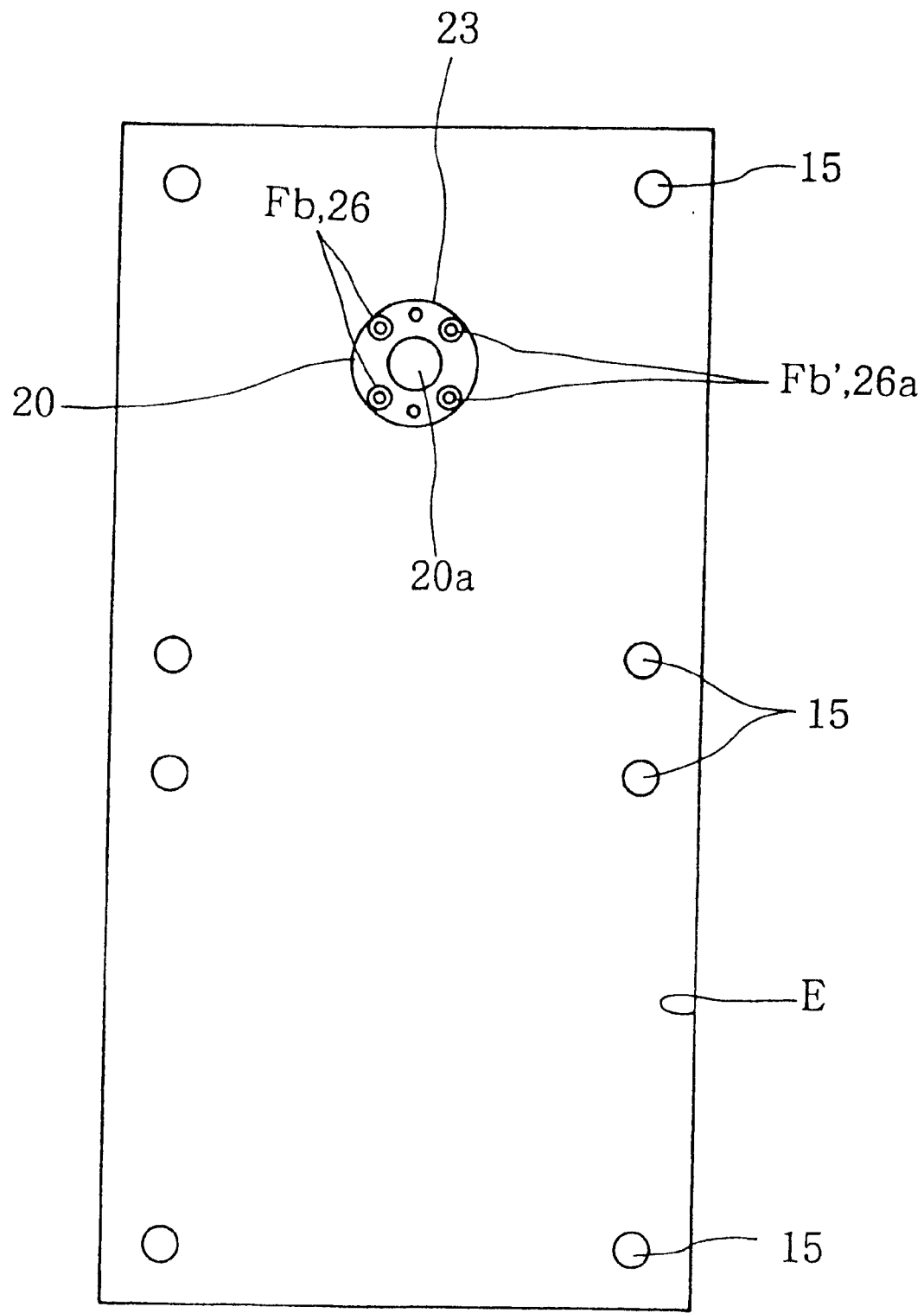
FIG. 23 is a bottom view of the filtration cloth with the cylindrical portion for constituting the fuel filter A.
Figure 24:
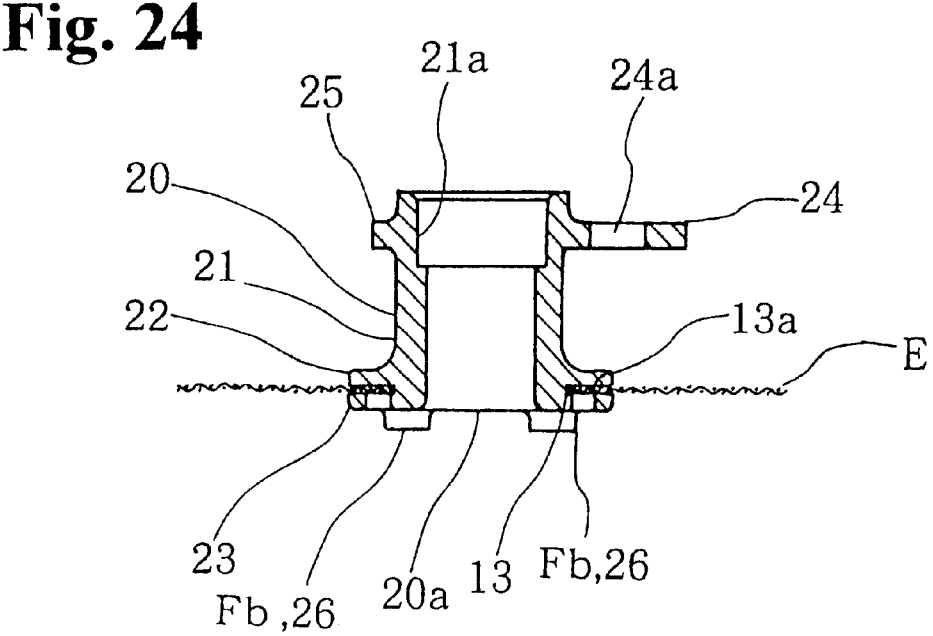
FIG. 24 is a sectional view of an essential part of the cylindrical portion.
Figure 25:
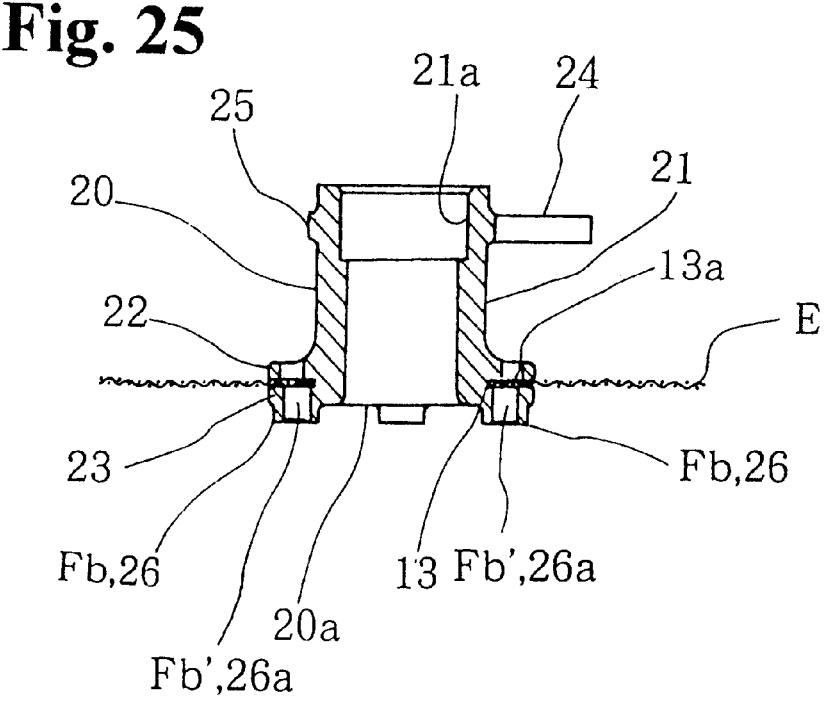
FIG. 25 is a sectional view of an essential part of the cylindrical portion cut in a different section.

FIGS. 22–32 are drawings showing constituting members of the fuel filter A' of the second embodiment together with constituting members in the production stages. FIG. 22 is a diagram showing a state before a filtration cloth E with a cylindrical portion 20 is formed into a bag shape member 10 and viewed from an upper side; FIG. 23 is a diagram showing a state of FIG. 22 but viewed from a lower side; and FIGS. 24 and 25 are sectional views showing an essential part of a joint portion of the filtration cloth E and the cylindrical portion 20 but cut in different directions, wherein FIG. 24 is a sectional view taken along a lengthwise direction of the filtration cloth E, and FIG. 25 is a sectional view taken along a surface including supporting projections 26.

Figure 26:
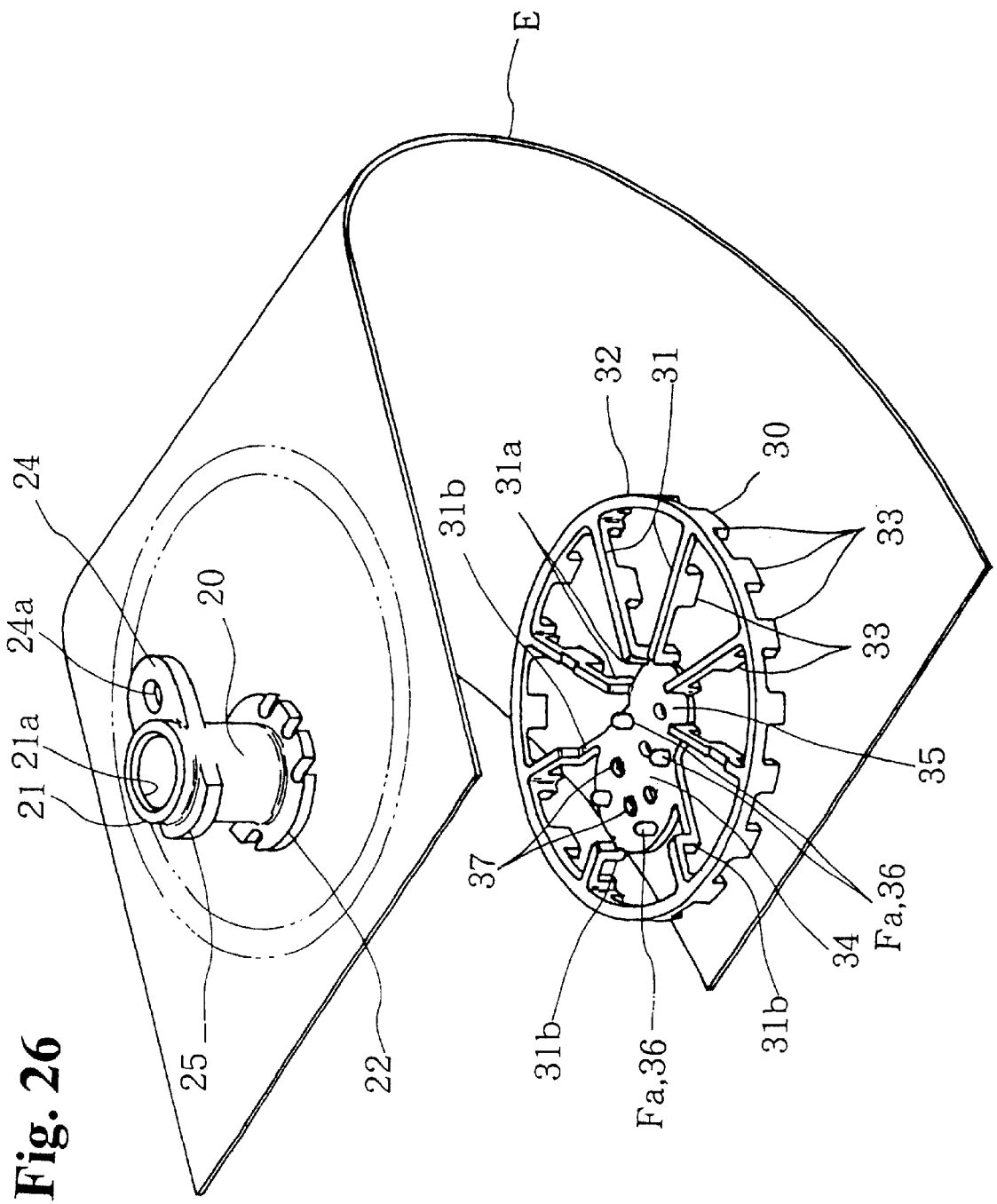
FIG. 26 is a perspective view for showing an assembling state of the filtration cloth provided with the cylindrical portion and the shape keeping frame to be wrapped therewith for constituting the fuel filter A'.

FIG. 26 is a perspective view showing a state where the shape keeping frame 30 is wrapped by the filtration cloth E with the cylindrical portion 20 to form the fuel filter A'.

Figure 27:
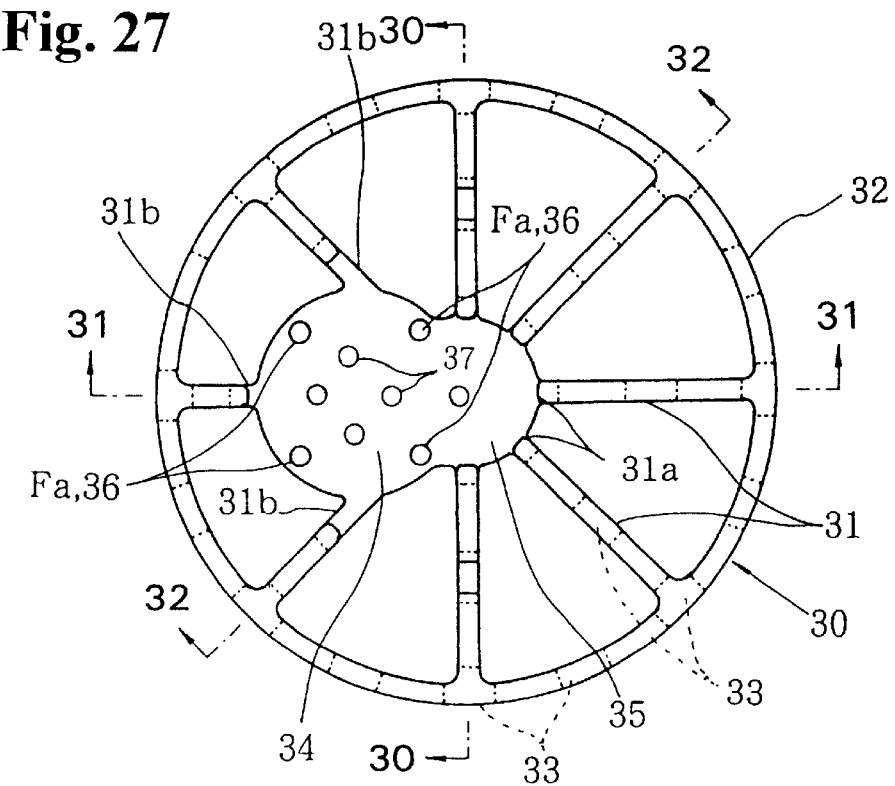
FIG. 27 is a plan view of the shape keeping frame for constituting the fuel filter A'.
Figure 28:
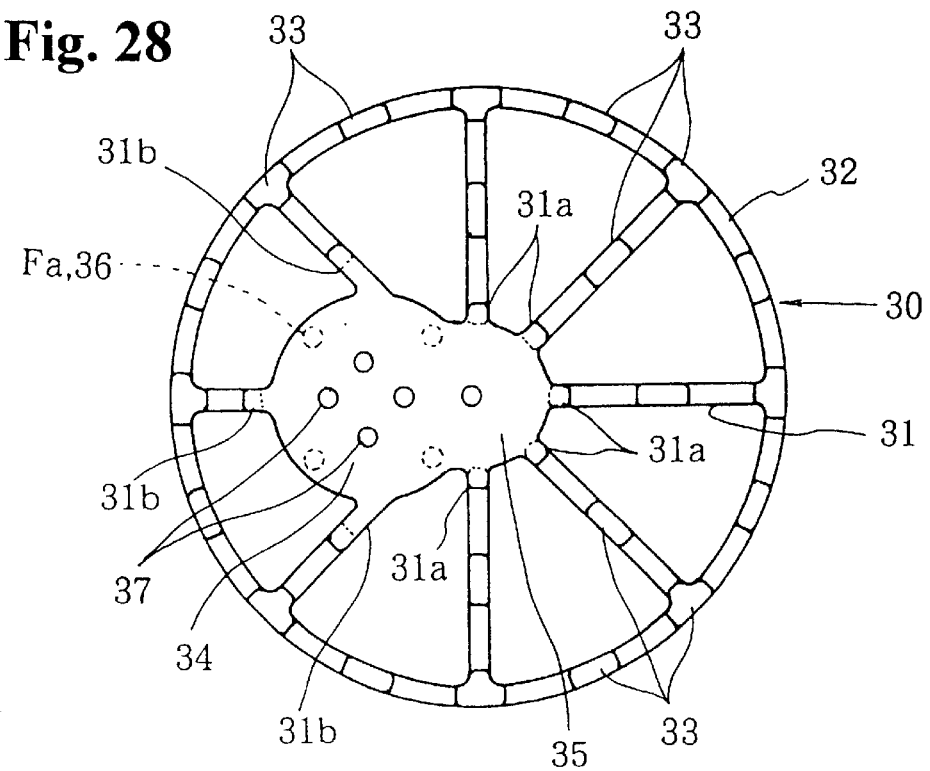
FIG. 28 is a bottom view of the shape keeping frame.
Figure 29:
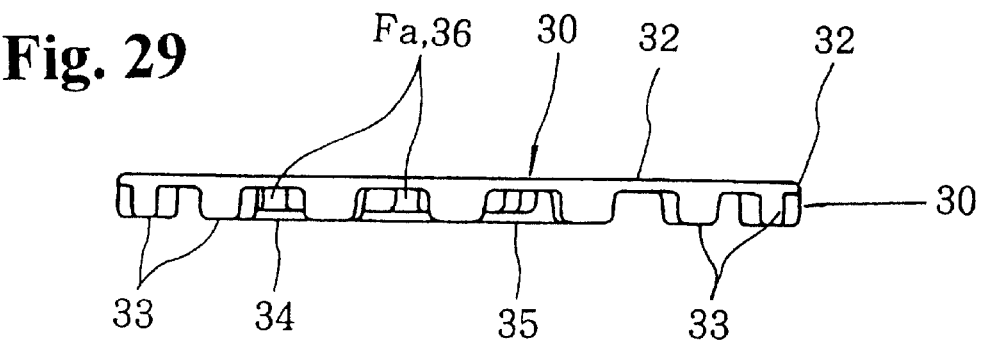
FIG. 29 is a front view of the shape keeping frame.

FIGS. 27–32 are drawings showing the shape keeping frame 30 for constituting the fuel filter A', wherein FIG. 27 is a drawing viewed from an upper side thereof; FIG. 28 is a drawing viewed from a lower side thereof; and FIG. 29 is a drawing viewed from a front side thereof.

Figure 30:
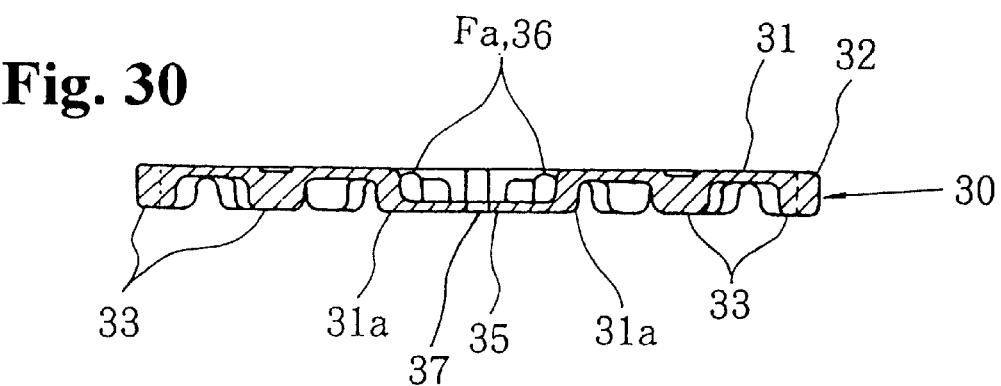
FIG. 30 is a sectional view taken along line 30—30 in FIG. 27.
Figure 31:
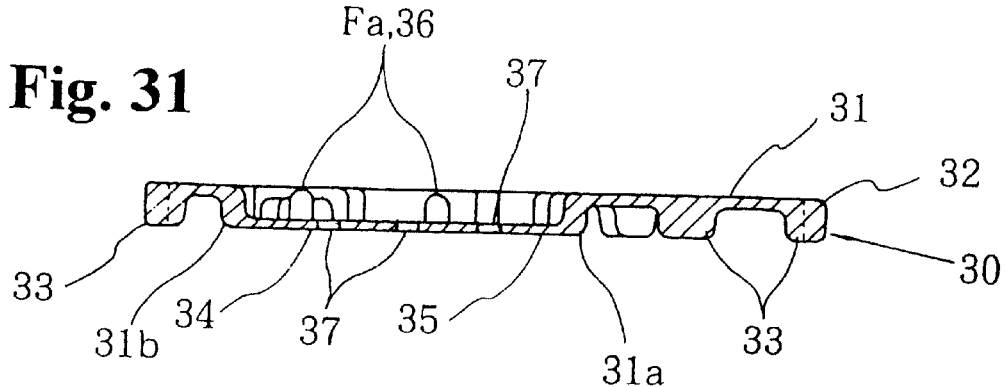
FIG. 31 is a sectional view taken along line 31—31 in FIG. 27.
Figure 32:
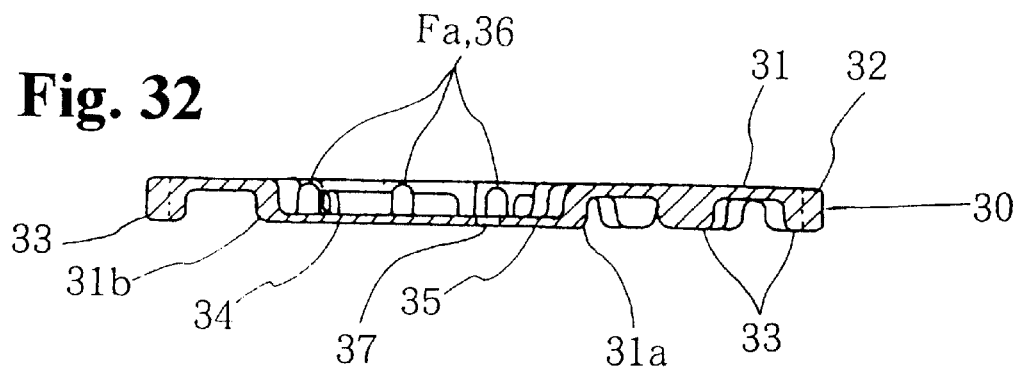
FIG. 32 is a sectional view taken along line 32—32 in FIG. 27.

FIG. 30 is a sectional view taken along line 30—30 in FIG. 27 passing through only a central plate shape portion 35; FIG. 31 is a sectional view taken along line 31—31 in FIG. 27 passing through centers of the central plate shape portion 35 and a plate shape portion 34; and FIG. 32 is a sectional view taken along line 32—32 in FIG. 27 passing through a side portion of the plate shape portion 34 and the center of the central plate shape portion 35.

First, the typical fuel filter A of the first embodiment as shown in FIGS. 1–16 is explained specifically.

The fuel filter A as shown in FIGS. 1–16 is positioned in a chamber D formed in a fuel tank B, and is attached to a fuel pump C, i.e. in-tank type electric fuel pump C. Namely, the fuel filter is located at a suction side 40' of the fuel pump C, i.e. inner bottom surface b of the fuel tank B with respect to a sucking pipe 40. In particular, the lower side 10a of the bag shape member 10 contacts the inner bottom surface b of the chamber D, which becomes the bottom surface of the fuel pump B.

The fuel pump C disposed in the fuel tank B is provided with a supplying pipe for supplying sucked fuel G, such as gasoline, to an engine on a discharging side (not shown), and surplus fuel from the engine is returned to the fuel tank B through a return pipe 41.

More specifically, the fuel G in the fuel tank B is filtered and sucked into the fuel filter A by operating the fuel pump C; the fuel G thus introduced into the fuel filter A is sucked from the suction side 40', more specifically, through the sucking pipe 40, to be fed to the engine from the not-shown discharging side of the fuel pump C; the surplus fuel in the engine is returned to the chamber D in the fuel tank B through the return pipe 41, which has a tapered forward end 41a inserted into a hole 46 formed on a side surface of the chamber D.

The fuel filter A attached to the suction side 40' of the fuel pump C, more specifically, the sucking pipe 40 provided to the fuel pump C, includes a bag shape member 10 made of a filtration cloth E suitable for filtering the fuel G, such as gasoline; a cylindrical portion 20 provided to the bag shape member 10 so as to communicate an outer side and an inner side of the bag shape member 10; and a shape keeping frame 30 for keeping a shape of the bag shape member 10 extending through the interior of the bag shape member 10 from the cylindrical portion 20. Especially, a plate shape portion 34 is formed on an inner surface 10c of the bag shape member 10 in front of an opening 20a of the cylindrical portion 20 inside the bag shape member 10, more specifically, inner surface 10c on the lower side of the bag shape member 10, so as to make a surface contact with each other.

First, the bag shape member 10 for constituting the fuel filter A is made of a filtration cloth E, which is not affected by the fuel G in the fuel tank B; which has a filtration function for catching and holding foreign materials, such as dust and water, contained in the fuel G to supply clean fuel G to an engine of a car; which has a function for allowing the fuel pump C to effectively pump up the fuel G through a capillary phenomenon of the filtration cloth E of the bag shape member 10 when an amount of the fuel G in the fuel tank B becomes little; and which has a function not to substantially suck air into the bag shape member 10 when the pump C sucks the fuel G.

As the filtration cloth E for constituting such a bag shape member 10, for example, there is used a mesh cloth made of a synthetic resin material, such as polypropylene, polyethylene or nylon, having a function for keeping the bag shape member 10 in an expanded state in addition to the functions mentioned above. More specifically, a twill cloth made of a synthetic resin material, such as, polypropylene, polyethylene or nylon resin, having the aforementioned functions can be used.

The bag shape member 10 is formed of an upper filtration cloth 11 and a lower filtration cloth 12 which are laminated together so as to sandwich the shape keeping frame 30 therebetween, and peripheral portions thereof are integrally welded at 14 by, for example, an ultrasonic welding to form a bag shape member with a flat disc.

A cylindrical portion 20 is provided to the upper filtration cloth 11 of the bag shape member 10 at a position near a side portion away from the center thereof, so that an outer side of the bag shape member 10 is communicated with an inner side thereof. Also, the shape keeping frame 30 is provided to extend in the bag shape member 10 from the cylindrical portion 20 located in the bag shape member 10.

The cylindrical portion 20 disposed to the upper filtration cloth 11 of the bag shape member 10 is typically, integrally provided to the upper filtration cloth 11 by a plastic forming material, such as polyacetals.

The cylindrical portion 20 provided to the upper filtration cloth 11 is formed by a plastic formation or molding integrally with the upper filtration cloth 11 to surround a peripheral edge 13a of a hole 13 positioned at a portion away from the center of the upper filtration cloth 11. A lower part of an attaching cylindrical portion 21 extending upwards from the upper filtration cloth 11 in an approximately perpendicular state is inserted into the peripheral edge 13a of the hole 13 of the upper filtration cloth 11 to form an upper outer flange 22 and a lower outer flange 23.

An upper edge side of the attaching cylindrical portion 21 of the cylindrical portion 20 provided to the bag shape member 10 is provided with an engaging hole 21a with a wider diameter. Also, a flat disc shape attaching piece 24 projecting toward the center of the bag shape member 10 is provided to an upper outer periphery of 20 the attaching cylindrical portion 21, and an abutting piece 25 is provided on a side opposite to the projecting attaching piece 24 to project from the outer periphery of the upper side of the attaching cylindrical portion 21. Also, the attaching piece 24 is provided with a through-hole 24a for an attaching pin 42 projecting downwards from the lower side of the fuel pump C.

The lower outer flange 23 of the cylindrical portion 20 located inside the bag shape member 10 is formed in a shape of annular disc, and provided with a plurality of supporting projections 26 as second projections Fb for constituting a space holding device F extending from the surface of the lower outer flange 23 downwards. Also, assembly holes 26a as holes Fb' are provided to the respective supporting projections 26 as the second projections Fb to extend from the tip ends thereof to reach the peripheral portion 13a of the opening of the filtration cloth E with which the cylindrical portion 20 is insert-molded.

In the bag shape member 10 integrally provided with the cylindrical portion 20 as described above, the shape keeping frame 30 is assembled to extend at right angles with the cylindrical portion 20 with respect to the lower outer flange 23 of the cylindrical portion 20 so that the shape keeping frame 30 is sandwiched between the upper side filtration cloth 11 and the lower filtration cloth 12 for constituting the bag shape member 10. Also, the shape keeping frame 30 is provided to extend from the lower outer flange 23 toward an inner peripheral portion of the bag shape member 10 structured as described above, so that the bag shape member 10 extends laterally in a direction at right angles with respect to the cylindrical portion 20 to thereby form a necessary space in the bag shape member 10.

The shape keeping frame 30 is provided in the bag shape member 10 and is attached to the cylindrical portion 20 to form a necessary space in the bag shape member 10 when the fuel G is pumped by the fuel pump C into the bag shape member 10. The shape keeping frame 30 includes, as essential elements, a ring portion 32 in about a circular shape; a central plate shape portion 35 in about a semicircular shape, located at about the center of the ring portion 32 away from the opening 20a of the cylindrical portion 20, and positioned on an imaginary plane parallel to an imaginary plane of the ring portion 32; a plate shape portion 34 connected to the central plate shape portion 35 to be disposed on the same plane and located in front of the opening 20a of the cylindrical portion 20, i.e. facing the lower outer flange 23, the portion 35 having nearly the same circular size as that of the lower outer flange 23 to thereby form a passage H of the fuel G between the lower outer flange 23 and the plate shape portion 34; a plurality of bar shape portions 31 for forming an integral structure by connecting the plate shape portion 34, the central plate shape portion 35 and the ring portion 32; projections 36 as the first projections Fa to be provided to the plate shape portion 34 as a space holding device F; and abutting pieces 33 provided to the ring portion 32 and bar shape portions 31. The shape keeping frame 30 is typically formed of plastic integrally molded together as one unit, i.e. plastic molded material with a predetermined flexibility, such as polyacetals.

The bar shape portions 31 for constituting the shape keeping frame 30 extend between the ring portion 32 and a peripheral side portion of the plate shape portion 34 and between the ring portion 32 and the central plate shape portion 35 such that the bar shape portions 31 are located on the imaginary plate formed by the ring portion 32, and extend radially inwardly from the ring portion 32 to the peripheral side edges or side portions of the plate shape portion 34 and the central plate shape portion 35. An inner side edge of each bar shape portion 31 is bent with right angles toward the peripheral side edge of the central plate shape portion 35 to form a continuous portions 31a, and the peripheral side of the forward edge of the continuous portion 31a is integrally connected to the central plate shape portion 35. Also, an inner edge portion in some bar shape portions 31 extending toward the plate shape portion 34 is bent with right angles to the side of the imaginary plane formed by the plate shape portion 34, and is further bent with right angles to extend along the imaginary plane formed by the plate shape portion 34, so that an L-character shape continuous portion 31b integrally connected to the plate shape portion 34 is formed. Thus, the ring portion 32, bar shape portions 31, plate shape portion 34 and central plate shape portion 35 are formed into an integral structure. Further, the surface formed by the plate shape portion 34 and the central plate shape portion 35 with respect to the surface formed by the ring portion 32 and bar shape portion 31 can be separated from the opening 20a of the cylindrical portion 20, more specifically, the lower outer flange 23.

In the shape keeping frame 30, the continuous portions 31a and the L-character shape continuous portions 31b provided between the bar shape portion 31 and the plate shape portion 34 or the central plate shape portion 35 are bent at right angles, respectively, so that a space formed between a plane of the bar shape portions 31 on the side of the cylindrical portion 20 and a plane formed by the plate shape portion 34 and the central plate shape portion 35 on the side opposite to the cylindrical portion 20 is approximately equal to a size between a side portion facing an upper inner surface 10d of the upper filtration cloth 11 at the lower outer flange 23 located at a lower portion of the upper filtration cloth 11 and a forward edge of the supporting projection 26 as the second projection Fb projected from the lower outer flange 23. Thus, the upper surface side 10b of the bag shape member 10 integrally provided to the cylindrical portion 20 extends along an upper surface of the shape keeping frame 30 in a horizontal direction, more specifically, in a direction perpendicular to a cylinder axis of the cylindrical portion 20.

The respective projections 36 as the first projections Fa for constituting the space holding device F provided on the side facing the cylindrical portion 20 of the plate shape portion 34 of the shape keeping frame 30 are disposed to correspond to the assembling holes 26a as the holes Fb' of the supporting projections 26 as the second projections Fb for constituting the other portion of the space holding device F. Moreover, the forward edges of the respective supporting projections 26 as the second projections Fb abut against the surface of the plate shape portion 34 in a state where the projections 36 are inserted into the assembling holes 26a as the holes Fb', so that the plate shape portion 34 is assembled with the cylindrical portion 20 with a necessary space therebetween by the projections 36 together with the supporting projections 26 as the second projections Fb.

Also, by assembling the projections 36 as the first projections Fa in an inserted state into the assembling holes 26a as the holes Fb' of the supporting projections 26, the shape keeping frame 30 assembled with the cylindrical portion 20 can be prevented from being deviated in a side direction. Also, the plate shape portion 34 of the shape keeping frame 30 can be moved in parallel in the front and rear directions in front of the opening 20a of the cylindrical portion 20, so that the plate shape portion 34 is advantageously positioned in front of the opening 20a of the cylindrical portion 20 when the attached fuel filter A is bent or deformed.

Also, the abutting pieces 33 are provided to the ring portion 32 and the bar shape portions 31 located at the same plane as that of the ring portion 32 to project perpendicularly to the plane formed by the ring portion 32 and the bar shape portions 31 on the side opposite to the cylindrical portion 20. Also, font edges of the abutting pieces 33 and the surfaces of the plate shape portion 34 and the central plate shape portion 35 on a side opposite to the cylindrical portion 20, in other words, the side contacting a lower inner surface 10c, are positioned on an approximately the same imaginary plane. Thus, the lower surface side 10a of the bag shape member 10 extends horizontally, more specifically, in a direction perpendicular to the cylinder axis of the cylindrical portion 20.

In the fuel filter A thus structured, the lower outer flange 23 of the cylindrical portion 20 faces the circular plate shape portions 34 of the shape keeping frame 30, and the projections 36 as the first projections Fa are inserted into the assembling holes 26a of the supporting projections 26 as holes Fb' of the second projections Fb so that the upper inner surface 10d of the upper filtration cloth 11 positioned on the lower outer flange 23 is located on the upper surfaces of the bar shape portions 31. Also, the shape keeping frame 30 is provided in a direction perpendicular to the cylinder axis of the cylindrical portion 20. Further, the shape keeping frame 30 is sandwiched between the upper circular filtration cloth 11 extending perpendicularly to the cylinder axis of the cylindrical portion 20 and a lower circular filtration cloth 12 having approximately the same diameter as that of the upper filtration cloth 11 and extending parallel to the upper filtration cloth 11. In an assembled state of the shape keeping frame 30 and cylindrical portion 20, the upper filtration cloth 11 and the lower filtration cloth 12 are integrally welded at 14 at their peripheral edge portions.

More specifically, in the fuel filter A thus structured, there is provided the shape keeping frame 30 extending laterally in the direction perpendicular to the cylinder axis of the cylindrical portion 20. Also, the plate shape portion 34 having a diameter larger than that of the opening 20a is provided in front of the opening 20a of the cylindrical portion 20 in the bag shape member 10 to block the front portion of the opening 20a with a predetermined space therefrom and the lateral extent in the direction perpendicular to the cylinder axis, by inserting the projections 36 into the assembling holes 26a of the supporting projections 26 of the second projections Fb of the space holding device F. Moreover, the shape keeping frame 30 extending laterally is held inside the bag shape member 10 formed of the upper filtration cloth 11 and the lower filtration cloth 12 in a state where the projections 36 are inserted into the assembling holes 26a of the supporting projections 26, by welding at the peripheral edge portions 14 of the upper filtration cloth 11 and the lower filtration cloth 12 parallel to the surface of the shape keeping frame 30.

The fuel filter A thus structured is disposed on the absorbing side 40' of the fuel pump C located in the chamber D. The flat bag shape member 10 extends in the direction perpendicular to the cylinder axis of the cylindrical portion 20, and the lower side 10a of the bag shape member 10 makes a surface contact with an inner bottom surface b of the fuel tank B.

The fuel filter A as described above can be attached to the fuel pump C in such a manner that the abutting piece 25 and attaching piece 24 of the cylindrical portion 20 are caused to abut against the respective abutting portions 43, 44 disposed on the lower side of the fuel pump C so that the absorbing pipe 40 of the fuel pump C can be guided into the hole portion 21a of the fuel filter A; the attaching pin 42 provided to the abutting portion 43 is inserted into the hole 24a of the attaching piece 24; and a fitting ring with teeth 45 is pushed in against the attaching pin 42 in a state that the absorbing pipe 40 is closely inserted into the hole portion 21a.

In the fuel filter A thus structured, when the fuel G in the fuel tank B is sucked by the fuel pump C to supply to an engine, the plate shape portion 34 disposed in front of the opening 20a of the cylindrical portion 20 with a predetermined distance thereto by the space holding device F laterally supports the lower inner surface 10c of the bag shape member 10 to thereby prevent the bag shape portion 10 in front of the opening 20a, more specifically, the lower filtration cloth 12, from being closely attached to the opening 20a. Also, the passage H of the fuel G located between the opening 20a, especially, the lower outer flange 23, and the plate shape portion 34 can be effectively held, so that the fuel G filtered and sucked into the bag shape member 10 can be supplied to the fuel pump C from the cylindrical portion 20 through the passage H.

As the result, even if a space between the opening 20a of the cylindrical portion 20 and the lower inner surface 10c of the bag shape member 10 facing the opening, more specifically, the inner surface 10c of the lower filtration cloth 12, is small, the passage H of the fuel G can be securely obtained. Also, the fuel filter A with the flat bag shape member 10 can be disposed to the fuel pump C which is provided with a narrow space between an inner bottom surface b of the fuel tank B and itself.

Also, as described above, since the plate shape portion 34 is provided in front of the opening 20a of the cylindrical portion 20, even if the lower filtration cloth 12 of the bag shape member 10 located in front of the opening 20a is exposed to air from the fuel surface due to inclination of the fuel tank B, problems, such as air absorption through the fuel pump C, can be prevented as little as possible.

Also, even if the bag shape member 10 abutting against the inner bottom surface b of the fuel tank B is obliged to change its abutting state, since the shape keeping frame 30 is assembled with the cylindrical portion 20 such that the projections 36 are inserted into the assembling holes 26a, changes can be made following the changes of its abutting state. Thus, the bag shape member 10 can effectively cope with the inner bottom surface b of the fuel tank B to thereby hold its abutting state.

Further, the shape keeping frame 30 includes the bar shape portions 31 extending toward the center thereof, more specifically, radially extending from the central plate shape portion 35; the central plate shape portion 35; the plate shape portion 34 connected to the central plate shape portion 35; and the abutting pieces 33 provided to the ring portion 32 and the bar shape portions 31, so that the fuel G is effectively absorbed into the bag shape member 10 through the whole surfaces thereof and guided into the cylindrical portion 20 through the flow passage with less resistance.

Next, a typical producing method of the fuel filter A having the structure as described above is explained.

First, a hole 13 is provided on one side portion of the filtration cloth E having. a rectangular shape; then the filtration cloth E is positioned in a plastic molding die; and the cylindrical portion 20 having the above structure is molded to cover the peripheral edge portion 13a of the opening 13.

Through such a plastic molding, the peripheral edge portion 13a of the opening 13 of the filtration cloth E is sandwiched between the upper outer flange 22 and the lower outer flange 23, so that the cylindrical portion 20 is provided perpendicularly to the filtration cloth E (Refer to FIGS. 6 to 9).

Incidentally, the cylindrical portion 20 disposed on one side of the filtration cloth E is structured to have the attaching piece 24 facing the other side of the filtration cloth E; the shape keeping frame 30 with the structure as described above is assembled with the lower outer flange 23 of the cylindrical portion 20, more specifically, the projections 36 as the first projections Fa provided to the plate shape portion 34 of the shape keeping frame 30 are inserted into the assembling holes 26a as holes Fb' of the supporting projections 26 as the second projections Fb of the cylindrical portion 20 so that the plate shape portion 34 is assembled with the cylindrical portion 20 with a predetermined space away therefrom by the space holding device F; and then the filtration cloth E is folded to wrap the shape keeping frame 30 therewith (Refer to FIG. 10).

Then, the cloth portions of the filtration cloth E disposed on the upper and lower sides of the shape keeping frame 30 are welded with a welding margin 14, for example, as shown by two dotted chain lines in FIG. 10 along an outer peripheral side of the shape keeping frame 30 so that the shape keeping frame 30 sandwiched between the cloth portions of the filtration cloth E is held in a state where the projections 36 as the first projections Fa are inserted in the assembling holes 26a of the supporting projections 26 as holes Fb' of the second projections Fb by the cloth portions of the filtration cloth E laminated on the upper and lower sides of the shape keeping frame 30. Portions other than the welding margin are removed to thereby form the fuel filter A.

Incidentally, when the filtration cloth E is welded, the filtration cloth E is welded in a squeezed state not to form a play space around the peripheral side of the shape keeping frame 30 to thereby hold the shape keeping frame 30 wrapped in the filtration cloth E in a state where the projections 36 as the first projections Fa on the plate shape portion 34 of the shape keeping frame 30 are inserted into the assembling holes 26a of the supporting projections 26 as the holes Fb' of the second projections Fb in the cylindrical portion 20. Further, by removing the outer side from the welding margin, the shape keeping frame 30 is stably assembled or provided to the cylindrical portion 20 between the upper filtration cloth 11 and the lower filtration cloth 12 to form the fuel filter A.

Incidentally, in FIGS. 6 and 7, numeral 15 represents guide holes to be used for molding the fuel filter A in use of the filtration cloth E.

Next, a fuel filter A' of a second embodiment as shown in FIGS. 17 through 32 is explained.

The fuel filter A' of the second embodiment is used for a fuel pump C of a fuel supplying system wherein a return pipe 41 as shown in FIG. 1 is structured to return a fuel to a fuel tank B other than a chamber D, or used for a fuel pump C of a fuel supplying system with no return pipe, so-called return-less type fuel supplying system. A structure of the fuel filter A' of the second embodiment is the same or substantially the same as that of the fuel filter A of the first embodiment as shown in FIGS. 1 through 16 except that a plurality of holes 37 for allowing the fuel G to flow therethrough is provided in the plate shape portion 34 of the shape keeping frame 30 to penetrate in the plate-thickness direction.

Therefore, the same, or substantially the same portions as those of the first embodiment are designated with the same numerals or symbols, and explanations for them are omitted.

The plate shape portion 34 of the shape keeping frame 30 for constituting the fuel filter A' of the second embodiment is provided with a plurality of holes 37 suitable for passing the fuel G therethrough in a plate-thickness direction. The fuel G filtrated and sucked into the bag shape member 10 through the lower filtration cloth 12 is guided to the passage H and supplied to the fuel pump C through the cylindrical portion 20 together with the fuel G sucked through the other portions of the bag shape member 10. Thus, a sucking surface of the fuel G in the fuel filter A' can be further widened.

In the fuel filters A, A' of the preceding embodiments, the space holding device F is formed of the projections 36 as the first projections Fa provided to the plate shape portion 34 of the shape keeping frame 30, and the supporting projections 26 provided with the assembling holes 26a as holes Fb' for receiving therein the projections 36 as the first projections Fa. However, in the present invention, the space holding device F is formed of a piece of projecting member, and the space holding device F as the projecting member may be provided only on the side of the shape keeping frame 30 so as to abut against the cylindrical portion 20 at a forward edge thereof, or may be provided only on the side of the cylindrical portion 20 so as to abut against the shape keeping frame 30 at a forward edge thereof.

Also, in the space holding device F formed of a plurality of the projecting members, the projecting members may be provided on both sides of the shape keeping frame 30 and the cylindrical portion 20 at shifted positions so that the respective forward edges do not contact each other.

In the fuel filter according to the present invention, since the plate shape portion is positioned in front of the opening of the cylindrical portion and the inner surface of the bag shape member can make a surface contact with the plate shape portion, the bag shape member located in front of the opening is not sucked toward the opening of the cylindrical portion even when the fuel is sucked by the fuel pump to thereby solve a problem to impair the sucking ability of the fuel pump upon suction of the bag shape portion toward the opening.

Also, with the structure as described above, the bag shape member can be formed as a thin flat bag so that the bag shape member is positioned close to the opening of the cylindrical portion with the opening. Thus, the lower side of the fuel pump can be positioned close to the inner bottom surface of the fuel tank.

While the invention has been explained with reference to the specific embodiments of the invention, the explanation is illustrative and the invention is limited only by the appended claims.

What is claimed is:

1. A fuel filter to be attached to a suction side of a fuel pump, comprising:

a bag member made of a filtration material;

a cylindrical portion attached to the bag member and having an opening to allow an interior of the bag member to communicate with the suction side of the fuel pump; and a shape keeping frame disposed in the bag member to extend from an inner side of the cylindrical portion located in the bag member to an inside of the bag member, said shape keeping frame having a plate shape portion disposed in front of the opening of the cylindrical portion to form a space relative to the opening and to make a surface contact with an inner surface of the bag member to thereby prevent the opening from clogging by the bag member; a ring portion; a central plate shape portion located at about a center of the ring portion away from the opening of the cylindrical portion and connected to the plate shape portion; bar shape portions extending radially inwardly from the ring portion, and provided between the ring portion and the central plate portion and between the ring portion and the plate shape portion; and abutting pieces provided on the ring portion and the bar shape portions to project from a side opposite to the cylindrical portion.

2. A fuel filter according to claim 1, wherein said bag member has a flat shape so that a lower side of the bag member can be disposed along an inner bottom surface of a fuel tank.

3. A fuel filter according to claim 1, wherein said plate shape portion has holes for allowing fuel to pass therethrough.

4. A fuel filter according to claim 1, wherein a fuel flow path is formed between the bar shape portions to allow fuel to pass therethrough.

5. A fuel filter according to claim 4, wherein lower sides of the abutting pieces and lower sides of the central plate and the plate shape portion are located on substantially a same plane spaced from upper sides of the bar shape portions.

6. A fuel filter according to claim 1, wherein said cylindrical portion includes a flange to which an upper side of the bag member is fixed, said upper side of the bag member extending radially outwardly and substantially horizontally from the cylindrical portion over upper sides of the bar shape portions and the ring portion.

7. A fuel filter according to claim 1, wherein said shape keeping frame includes a space holding device to keep the plate shape portion to be disposed in front of the cylindrical portion away from the opening thereof.

8. A fuel filter according to claim 7, wherein said space holding device includes first projections provided at one of the plate shape portion and the cylindrical portion opposite to the plate shape portion, and second projections provided at the other of the plate shape portion and the cylindrical portion and having holes for receiving the first projections therein, and the shape keeping frame is assembled with the cylindrical portion so that the first projections are inserted into the holes of the second projections and the assembled state is held by the bag member.

9. A fuel filter to be attached to a suction side of a fuel pump, comprising:

a bag member made of a filtration material;

a cylindrical portion attached to the bag member and having an opening to allow an interior of the bag member to communicate with the suction side of the fuel pump; and a shape keeping frame disposed in the bag member to extend from an inner side of the cylindrical portion located in the bag member to an inside of the bag member, said shape keeping frame having a plate shape portion disposed in front of the opening of the cylindrical portion to form a space relative to the opening and to make a surface contact with an inner surface of the bag member to thereby prevent the opening from clogging by the bag member, and a plurality of bar shape portions extending radially outwardly from a center thereof.

\* \* \* \* \*